United States Patent

Hutchinson

(10) Patent No.: US 10,235,895 B2
(45) Date of Patent: Mar. 19, 2019

(54) FACILITATED LEARNING-STRUCTURE GENERATION USING A SEMANTIC PUBLISHING SYSTEM

(71) Applicant: Pearson Education, Inc., Upper Saddle River, NJ (US)

(72) Inventor: William Hutchinson, Freshford (GB)

( * ) Notice: Subject to any disclaimer, the term of this patent is extended or adjusted under 35 U.S.C. 154(b) by 1061 days.

(21) Appl. No.: 14/170,169

(22) Filed: Jan. 31, 2014

(65) Prior Publication Data

US 2014/0363802 A1 Dec. 11, 2014

Related U.S. Application Data

(60) Provisional application No. 61/832,608, filed on Jun. 7, 2013.

(51) Int. Cl.
*G08B 5/00* (2006.01)
*G09B 5/08* (2006.01)

(52) U.S. Cl.
CPC ..................... *G09B 5/08* (2013.01)

(58) Field of Classification Search
USPC .................. 434/322, 323, 350, 365
See application file for complete search history.

(56) References Cited

U.S. PATENT DOCUMENTS

| | | | |
|---|---|---|---|
| 2007/0196808 A1* | 8/2007 | Call | 434/350 |
| 2010/0075288 A1* | 3/2010 | Sareday | 434/322 |
| 2012/0156667 A1* | 6/2012 | Singer | G09B 5/00 434/350 |

* cited by examiner

*Primary Examiner* — Kesha Frisby
(74) *Attorney, Agent, or Firm* — Quarles & Brady LLP

(57) ABSTRACT

An educational repository that can be made accessible to a structure-definer user (e.g., a teacher, web-page developer or editor). The structure definer can search or browse the repository to identify a subset of the content objects to include within a structure. An interface can allow the structure definer to specify inter-object relationships to include within a structure (e.g., such that a first object is to be presented to a learner prior to presentation of a second object). The structure that the structure definer generates can thus be used to determine which content objects are to be made available to learners (e.g., students, web-page visitors, readers or a structure definer herself) generally or at a given time. In this way, a structure definer can define a learning sequence that extends beyond just a general outline and controls actual object presentation.

20 Claims, 12 Drawing Sheets

| Learning Objectives | Content Object | Accessibility Type | Condition | Object Type | Skill Level |
|---|---|---|---|---|---|
| WEEK 1 | | | | | |
| - | Intro chapter | Push | - | *Static content* | *Grade 3* |
| Continents | Continent factoids | Conditioned | Learner request | *Dynamic content* | *Grades 3-5* |
| Continents | Continent lecture | Push | - | *Video* | *Grade 3* |
| Continents | Continent song | Conditioned | Map object completed | *Audio* | *Grade 3* |
| | | | | | |
| WEEK 2 | | | | | |
| Continent Locations | Interactive map | Push | - | *Dynamic content* | *Grade 3* |
| Continent Locations | Map quiz | Push | - | *Assessment* | *Grade 3* |
| - | Continent game | Conditioned | Map-quiz mastery | *Dynamic content* | *Grade 4* |
| North America | North America chapter | Conditioned | Map-quiz mastery | *Static content* | *Grade 3* |
| North America | North America quiz | Conditioned | Map-quiz mastery | *Assessment* | *Grade 3* |

FIG. 2B

| | | Object 1 | Object 2 | Object 3 | Object 4 | Object 5 | Object 6 |
|---|---|---|---|---|---|---|---|
| WEEK 1 | Objective 1 | X | X | X | | | |
| | Objective 2 | | | | X | X | X |
| WEEK 2 | Objective 3 | X | | | | | |
| | Objective 4 | | | | X | | |
| | Objective 5 | | | | | X | X |

FIG. 2D

FACILITATED LEARNING-STRUCTURE GENERATION USING A SEMANTIC PUBLISHING SYSTEM

CROSS-REFERENCE TO RELATED APPLICATIONS

This application claims the benefit of and priority to U.S. Provisional Application No. 61/832,608, filed on Jun. 7, 2013, which is hereby incorporated by reference in its entirety for all purposes.

BACKGROUND

This disclosure relates in general to methods and systems for facilitating a generation of a structure or a sequence of educational content objects in a manner that encourages user interest and understanding.

Conveying educational material to students is a complicated venture. Learning material must be appropriately selected and presented to enhance the learning experience. Nowadays, educational material is abundant, which offers great learning potential but also greatly complicates the selection process.

SUMMARY

In one embodiment, the present disclosure provides a method and system for facilitating a generation of a structure for or a sequence of educational content objects (e.g., that include text, images, audio streams, video streams, and/or interactive capabilities). A structure-definer user (e.g., a teacher, web-page developer or editor) can access part or all of searchable educational repository that includes a plurality of content objects. The structure definer can search or browse the repository to identify a subset of the content objects of interest for inclusion within a structure. An interface can allow a structure definer to specify inter-object relationships to include within a structure (e.g., such that a first object is to be presented to a learner prior to presentation of a second object or such that one of a set of objects is to be presented based on a learner's geographic location or selection). The structure that the structure definer generates can thus be used to determine which content objects are to be made available to learners (e.g., students, web-page visitors, readers or a structure definer herself) generally or at a given time. In this way, a structure definer can define a learning sequence that extends beyond just a general outline and controls actual object presentation.

For example, a teacher can generate a curriculum-based structure that calls specific content objects during various points in a course. Unlike traditional syllabi, this structure can be tied to a content repository, to "push" content objects at appropriate times to students or to limit content-object access. To illustrate, a teacher can search the repository for content objects pertaining to "triangles" and corresponding to a $5^{th}$-grade skill level. Query results can identify each query-matching content object's type (e.g., static textual chapter, dynamic quiz or an interactive learning game) and can further identify other concepts (e.g., more-refined concepts) characterizing each query-matching content object. The teacher can select individual content objects and tag each object for a portion of the structure. For example, objects (e.g., Objects #1-5) associated with a triangle-definition concept can be assigned to Week 3; objects (e.g., Objects #6-10) associated with a triangle-type concept, equilateral-triangle concept, an isosceles-triangle concept and/or a scalene-triangle concept can be assigned to Week 5, and objects (e.g., Objects #11-15) associated with a triangle-angle concept, a right-triangle concept, an acute-triangle concept and/or an obtuse-triangle concept can be assigned to Week 6. Within the structure, she can also set requirements and restrictions: for example, she may specify that Objects #1-3 are to be shown to all students in Week 3, that a student must have mastered triangle basics as measured based on Assessment Object #3 before Objects #6-10 are presented and that Object #13-14 are not to be shown until Week 6. The content objects can then be accordingly presented, made available and/or blocked from the teacher's students.

As exemplified by this example, the structure can be divided into elements (e.g., nodes or modules). Each of one, more or all of the elements can pertain to one or more topics, be associated with one or more skill levels and/or identify one or more content objects. Times at which content objects are pushed to (e.g., presented to without requiring a learner to request the object) learners at one or more times, and/or access can be restricted to one or more time windows, where the times and/or time windows correspond to the elements. A determination as to which structure element is a "current" element for a user can depend, e.g., upon results of one or more assessments (e.g., which can themselves be identified in a structure), an absolute or relative time (e.g., 5 minutes after a user first accessed a webpage or 3 weeks after a course began), input from a learner (e.g., requesting element advancement) and/or input from another party (e.g., a structure definer).

A number of content objects included in the repository can be quite large. Further, many content objects may not be of interest to a particular structure definer or appropriate for a given structure. Content-object metadata and inter-object connections in the repository can be used to assist a structure definer in identifying content objects of interest. In one instance, metadata and/or connections can be used to identify content objects responsive to a structure definer's query or to identify one or more "recommended" content objects based on a content object included in a structure or being viewed by the structure definer.

Metadata for each educational content object can identify information about the object, such as a learning objective, a concept, skill level, object type (e.g., book chapter versus assessment), and/or restriction (e.g., indicating that the object is only to be viewed by learners physically within a country or indicating that a fee is required to make the object available for structure inclusion). Connections between objects can signify a relationship between the objects, such that if a structure definer includes one object in a structure, it may be appropriate for her to further consider including a second object, which is connected to the first object, in the structure as well. For example, a first object may be connected to a second object (e.g., via weighted or unweighted connections) when the second object is cited within the first object, is a pre-requisite for the first object, and/or the second object is identified by a content-object provider as being related to the first object (e.g., the second object is an assessment pertaining to material in the first object). The connections and/or weights can be automatically determined (e.g., based on matching of metadata, analysis of structures or analysis of learner or structure-definer access patterns) or determined based on inputs from a provider of content objects.

In some embodiments, an educational semantic-based publishing system for facilitating development of structures identifying a series of content objects is provided. An educational content-object data store includes data for each of a plurality of educational content objects. A structure manager receives a first input from a structure definer that identifies an object characteristic and causes an identification of a first content object that is associated with the object characteristic to be presented. The plurality of educational content objects includes the first content object. The structure manager also receives one or more second inputs from the structure definer that indicates that the first content object and a second content object are to be added to a learning structure. The learning structure specifies which content objects are to be presented to a learner and includes a presentation sequence for the content objects. For each of the first and second content objects, the structure manager determines a position in the learning structure at which to add the content object (the position indicating) when the content object is to be presented and adds the content object to the learning structure at the position. The structure manager further causes a representation of the learning structure to be presented to the structure definer, wherein the representation indicates that the first content object is included at the first position in the structure and that the second content object is included at the second position. A query engine generates a query for searching the plurality of educational content objects to identify one or more content objects associated with the object characteristic and searches the content-object data store using the query to identify the first content object.

In some embodiments, a method for facilitating development of structures identifying a series of content objects is provided. Data for each of a plurality of educational content objects is stored in an educational content-object data store. A first input is received from a structure definer that identifies an object characteristic. A query is generated for searching the plurality of educational content objects to identify one or more content objects associated with the object characteristic. The content-object data store is searched using the query to identify a first content object associated with the object characteristic. An identification of the first content object is caused to be presented. The plurality of educational content objects includes the first content object. One or more second inputs are received from the structure definer that indicates that the first content object and a second content object are to be added to a learning structure. The learning structure specifies which content objects are to be presented to a learner and includes a presentation sequence for the content objects. For each of the first and second content objects, a position in the learning structure is determined at which to add the content object (the position indicating when the content object is to be presented) and the content object is added to the learning structure at the position. A representation of the learning structure is caused to be presented to the structure definer. The representation indicates that the first content object is included at the first position in the structure and that the second content object is included at the second position.

In some embodiments, a computer-program product tangibly embodied in a non-transitory machine-readable storage medium is provided. The product includes instructions configured to cause one or more data processors to perform a method disclosed herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 2A-2D illustrate representations of exemplary structures;

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
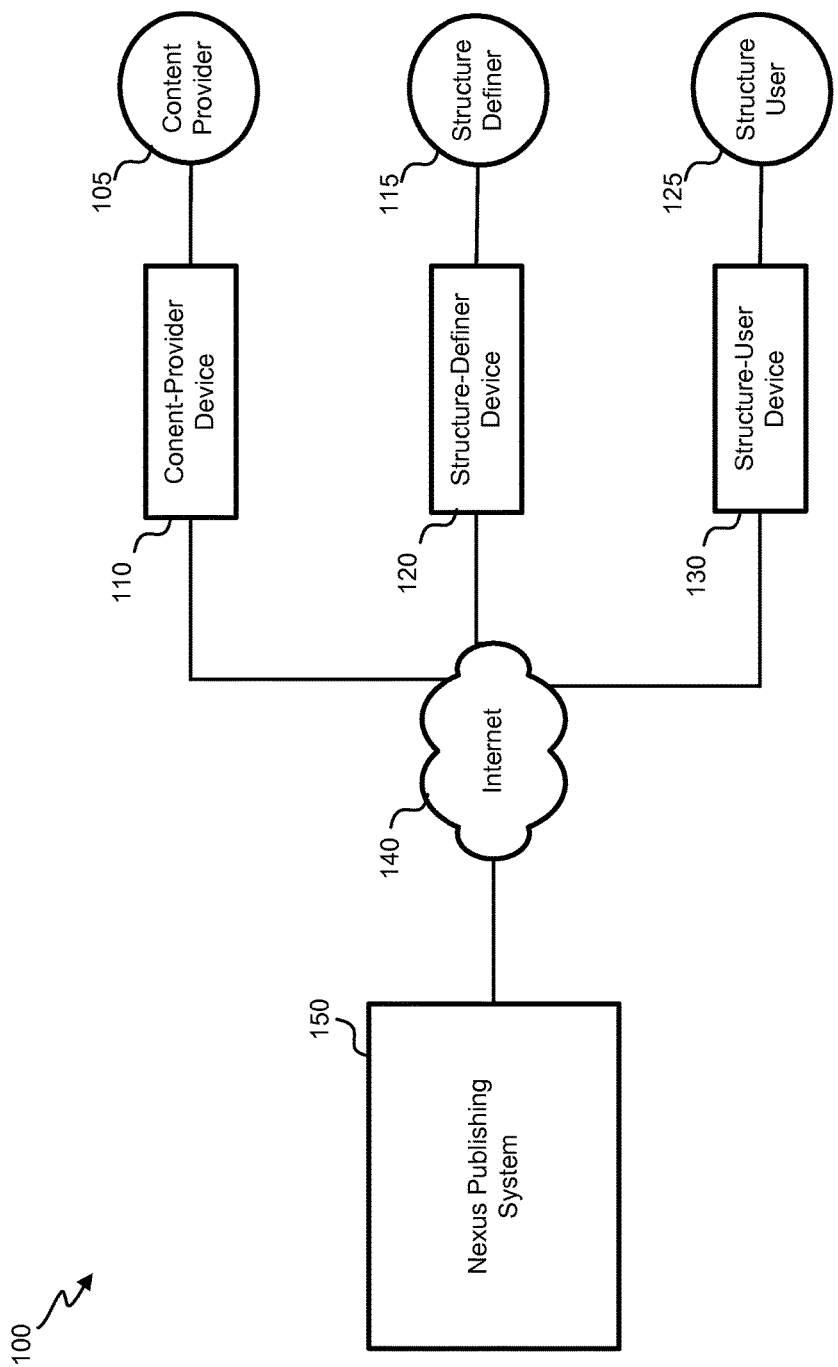
FIG. 1 depicts a block diagram of an embodiment of a semantic-publishing interaction system.

Referring first to FIG. 1, a block diagram of an embodiment of a semantic-publishing interaction system 100 is shown. A content provider 105, structure definer 115 and/or learner 125 can interact with a nexus publishing system 150 via respective devices 110, 120 and/or 130 and a network, such as the Internet 140 or a wide area network (WAN), local area network (LAN) or other backbone. In some embodiments, nexus publishing system 150 is made available to one or more of content provider 105, structure definer 115 and/or learner 125 via an app (that can be downloaded to and executed on a portable electronic device) or a website. It will be understood that, although only one content provider 105, user 115 and/or learner 125 are shown, system 100 can include multiple content providers 105, structure definers 115 and/or learners 125.

Content-provider device 110, structure-provider device 120 and/or user device 130 can each be a single electronic device, such as a hand-held electronic device (e.g., a smartphone). It will be understood that content-provider device 110, structure-provider device 120 and/or user device 130 can also include a system that includes multiple devices and/or components. The device(s) 110, 120 and/or 130 can comprise a computer, such as the desktop computer, a laptop computer or a tablet. In some instances, a party 105, 115 and/or 125 uses different devices at different times to interact with the nexus publishing system 150. For example, structure definer 115 can use a desktop computer initially to enter inputs to generate a structure and can later use a tablet to modify the structure.

A content provider 105 can provide a content object to nexus publishing system 150, and nexus publishing system 150 can store it in a repository for subsequent use and/or inclusion in structures. A content object can include, e.g., a text file, formatted document, webpage, image, etc. Content objects can include an informational content object, (e.g., a publication, learning module, learning object or book chapter) and/or an interactive content object (e.g., a dynamic informational learning object that selectively presents information based on user input, a game and/or an assessment, such as a quiz).

Content objects can be provided such that it can be accessed by learners 125. Thus, content provider 105 can, e.g., upload content to next publishing system 150, generate a content object (e.g., by typing text or defining an image, which may be accomplished using an interface provided by system 150), provide a link to a content object, etc. Content provider 105 can further identify properties of or associated with the content object, such as its name, author, level of detail, skill level, concept(s), learning objective(s), content type(s), usage restrictions, and/or language. In one instance, nexus publishing system 150 presents content provider 105 with a list of concepts, a list of learning objectives, a list of content types and/or a list of skill levels upon detecting a new object. Content provider 105 can then select one or more concepts, one or more learning objectives, one or more content types and/or one or more skill levels. The identified properties can be included in content metadata, which can be included as part of the content object or which can be stored separately from the content object but be associated with the content object.

A structure definer 115 can interact with nexus publishing system 150 to initialize a structure by defining elements in the structure. For example, structure definer 115 can identify a skill level for the structure, one or more high-level concepts and/or learning objectives, a number of elements in the structure and for each of one, more or all of the elements: an element name. For each element, structure definer 115 can identify one or more learning objectives. For example, nexus publishing system 150 can present one or more lists of all or select objectives (e.g., all high-level objectives, those matching a high-level learning objective or those matching a term in a search query entered by the structure definer) to the structure definer, such that one or more objectives can be selected for the general structure and/or for individual elements.

Further, for each element, structure definer 115 can identify one or more content objects. As one example, a structure definer can select a learning objective, and nexus publishing system 150 can present a list of content objects that match the learning objective, element characteristics (e.g., detail level, skill level or content types) and/or high-level structure characteristics (e.g., skill level and language). The list can detail characteristics for each identified content object, such as, e.g., its name, concept(s), learning objective(s), skill level, content type, and/or usage restriction. A structure definer 115 may further be able to view (and, in some instances, interact with) a given content object (e.g., by clicking on its representation).

Upon identifying a content object of interest, structure definer 115 can initiate an assignment of the object to an element in the structure. Nexus publishing system 150 can effect such assignment by, e.g., associating an identifier of the object with a representation of the element in the structure. It will be appreciated that, in some embodiments, a single object can be assigned to multiple elements (e.g., in one or more structures).

Multiple objects can be assigned to a single structure element. Structure definer 115 can specify relationships between the objects for the structure. For example, relationships can indicate that a learner must access or view (and/or master) a first content object before being able to view a second content object. As another example, a relationship can indicate that a first content object is associated with a higher (or lower) degree of detail (generally or for a particular concept) relative to a second content object.

In addition to structure-specific relationships, a repository can include object relationships. For example, the repository can indicate that one content object cites another content object. Nexus publishing system 150 can identify the relationships using structures and/or access patterns. For example, a relationship can indicate that two content objects were included in a same structure, were assigned to a same element in a structure, were both accessed (or sequentially accessed) by more than a threshold number of learners and/or were part of a same higher-level object (e.g., were chapters in a same book). These relationships can be used to provide content-object recommendations to a structure definer 115.

For one or both of structure-specific relationships and repository relationships, each of one or more relationships can be weighted. The weight can reflect, e.g., a degree to which the content objects are related or a probability that a structure definer 115 or learner 125 accessing one of the objects will also access (if given the opportunity) the other content object. Based on the relationships (and, in some instances, their weights), content-object recommendations can be provided. For example, if a structure definer 115 assigns a first content object to a structure, identifications of a set of second content objects can be presented for possible inclusion in the structure. As another example, if a learner 125 is viewing a first content object, a set of second content objects from the structure can be presented for possible subsequent viewing.

Structure definer 115 can specify an accessibility type for a content object. Alternatively or additionally, the repository can include a content object's accessibility type (e.g., based on information as provided by a content provider 105.) An accessibility type can indicate that a content object is "required", such that it is to be presented to a learner even if the learner does not select the content object for presentation. An accessibility type can indicate that presentation of the object is conditioned, e.g., such that it is not to be presented until a different object was presented to a learner, until a learner has received an above-threshold mastery score or until a certain time criterion is met (e.g., a time period has elapsed or an absolute time is detected).

Once generated, nexus publishing system 150 can store the structure itself. In some instances, the structure can be made available to some or all other structure definers 115.

For example, a structure defined by a first-grade teacher of School A may be made available to all other teachers of School A, all other teachers in a district of School A or all other first-grade teachers. In one instance, such access can allow other structure definers 115 to draw from ideas from the structure. In one instance, such access allows the structure to be made usable for a new set of users (e.g., students in a class of another teacher).

In one instance, the structure can be incorporated (in part or in whole) into other structures. As one example, upon receiving a search query from a structure definer 115 or upon receiving a learning-objective selection, nexus publishing system can identify structures matching the query (e.g., being associated with a learning objective, concept, title, element title or content object that matches the query) or learning objective. The structure can then be identified to the structure definer 115 (e.g., along with identifications of other query-matching learning objectives and/or content objects). As another example, when a structure definer 115 views information about a content object or assigns the content object to a structure, one or more other structures that similarly included assignments for the object can be identified to the structure definer 115. The structure definer 115 can use such an identification, e.g., to consider other content objects or relationships for the structure or to incorporate part or all of another structure into the present structure (e.g., by dragging and dropping a representation of a portion of a structure, the content-object assignments and relationships in the portion from the portion can be mirrored in the present structure).

A structure can be "used" by one or more learners 125. Users of a given structure can include, e.g., one or more persons identified by a structure definer or other party; one or more persons associated with a course, activity or event (e.g., students enrolled in a course); or one or more persons viewing a webpage or other information portal. Elements and content objects represented in the structure can act to guide the user through an informational experience.

Thus, in one situation, for a given user and for a given moment in time, a determination can first be made as to which element of the structure is applicable. This determination can be made based on, e.g., characteristics of elements in the structure, the current time, a characteristic of the user (e.g., a current grade in a course) a past access history of the user and/or a selection made by the user. Using the structure, content objects for the element can be identified, as can relationships and/or accessibility types for the objects. A determination can then be made as to which content object to present. This determination can be based on, e.g., specifications for the element and/or its content objects (e.g., specifying that a particular content object is to be presented before others or at a given time), based on a characteristic of the user, a past access history of the user and/or a selection made by the user. Thus, through structure generation, a structure definer 115 can specify and/or influence which content objects are presented to a learner 125 at a particular time, such that available content objects can be tied to a learning objective.

Figure 2A:
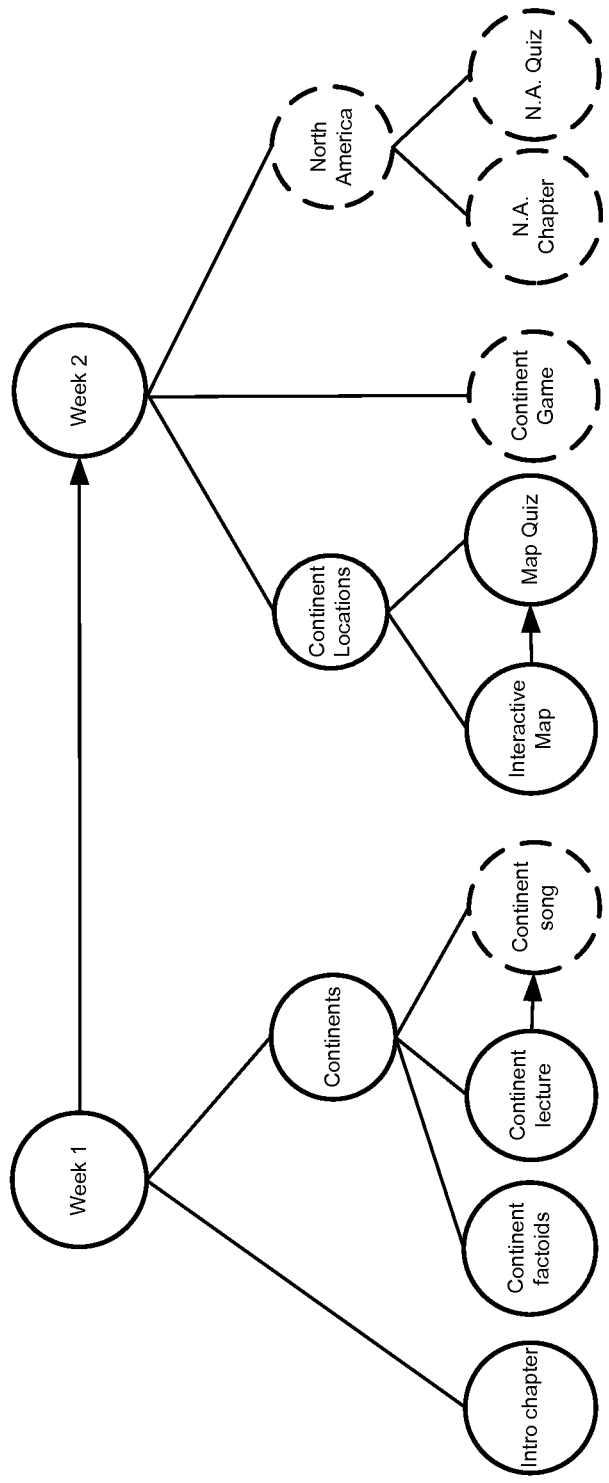

FIGS. 2A-2B illustrate two representations of a same structure, where structure components are represented by nodes. Structure components can include structure-organizational features (e.g., elements or learning objectives) or content objects. Structure components are represented by nodes in the representation shown in FIG. 2A and by table features (e.g., cell groupings, such as sub-tables and rows) in the representation shown in FIG. 2B.

In this instance, the structure is divided into elements corresponding to weeks of a geography course. Two such weeks are shown in the depicted representations. For each element (i.e., week), one or more learning objectives are identified. During week 1, the sole identified learning objective is Continents. During week 2, the learning objectives are Continent locations and North America. One or more content objects are identified as corresponding to each element. As shown, in some embodiments, a single content object can correspond to both a structure element and a learning objective or to merely a structure element.

In some instances, an accessibility type can be defined for each of one or more content object. For example, content objects represented by solid-lines nodes in FIG. 2A indicate that they are to be pushed to learners, such that they are presented to learners irrespective of whether a request was made for the object. Content objects represented by dashed nodes indicate that presentations of such objects are conditioned. Exemplary conditions are noted in the representation shown in FIG. 2B and can include, e.g., completed access of another content object, receipt of a request for the object from a learner and/or mastery of a concept or learning objective as measured using an assessment.

The representation of the structure shown in FIG. 2B identifies other characteristics of the represented content objects. Such information may auto-populate to easily convey information of potential interest about the objects to a structure definer. Specifically, the last two columns show the type of the content object and the skill level. A structure definer may use these information to achieve a desired object-type variety and to focus on an appropriate skill level.

Figure 2C:
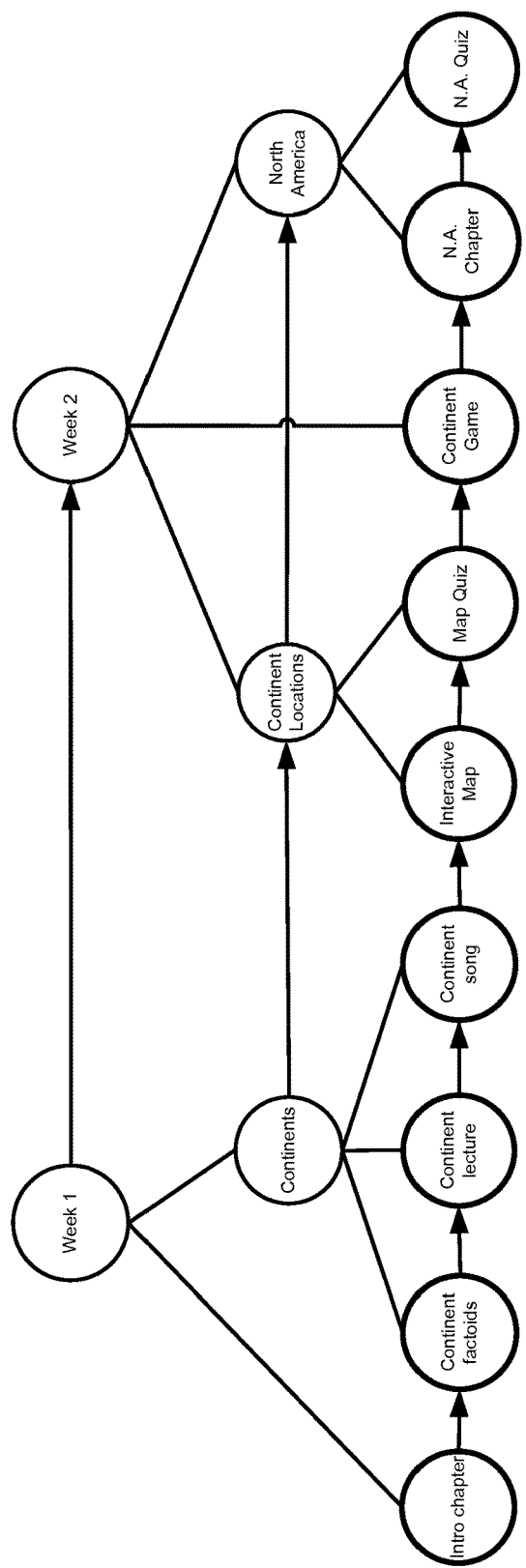

FIG. 2C illustrates a node-based representation of a similar structure. The structures represented in FIGS. 2A-2B allowed some flexibility surrounding what would be presented to a learner and when (e.g., depending on factors such as object selection and assessment results). Thus, a path that a learner would navigate through the structure would be undeterminable in advance. FIG. 2C represents a more deterministic structure, where all content objects are to be pushed to all users in a specified order. Thus, this figure represents multiple learning graphs, each of which represents a sequence for structure components. For example, a learning-objective sequence and a content-object sequence are shown. The specified directionality indicates that the structure is progressive and determined.

FIG. 2D show an additional representation of a structure. In this instance, the first column identifies the structure element (which, for the depicted instance, is a week within a course). The second column identifies learning objectives for the week. The third through eighth columns identify content objects to be made accessible. The cells in these columns indicate, for each content object, which of the identified learning objectives the object pertains to. Thus, it will be appreciated that a structure can be visually represented in a variety of manners and can convey information across many dimensions, some of which include specifications from a structure definer and some of which are auto-populated (e.g., based on information from a content provider, usage patterns, etc.).

It will be appreciated that the representations shown in FIGS. 2A-2D are examples and that structures can include alternative relationships or can be represented in different manners. For example, a structure can be represented using a list and/or outline form (e.g., with elements, learning objectives and content objects being represented using different heading types).

Figure 3:
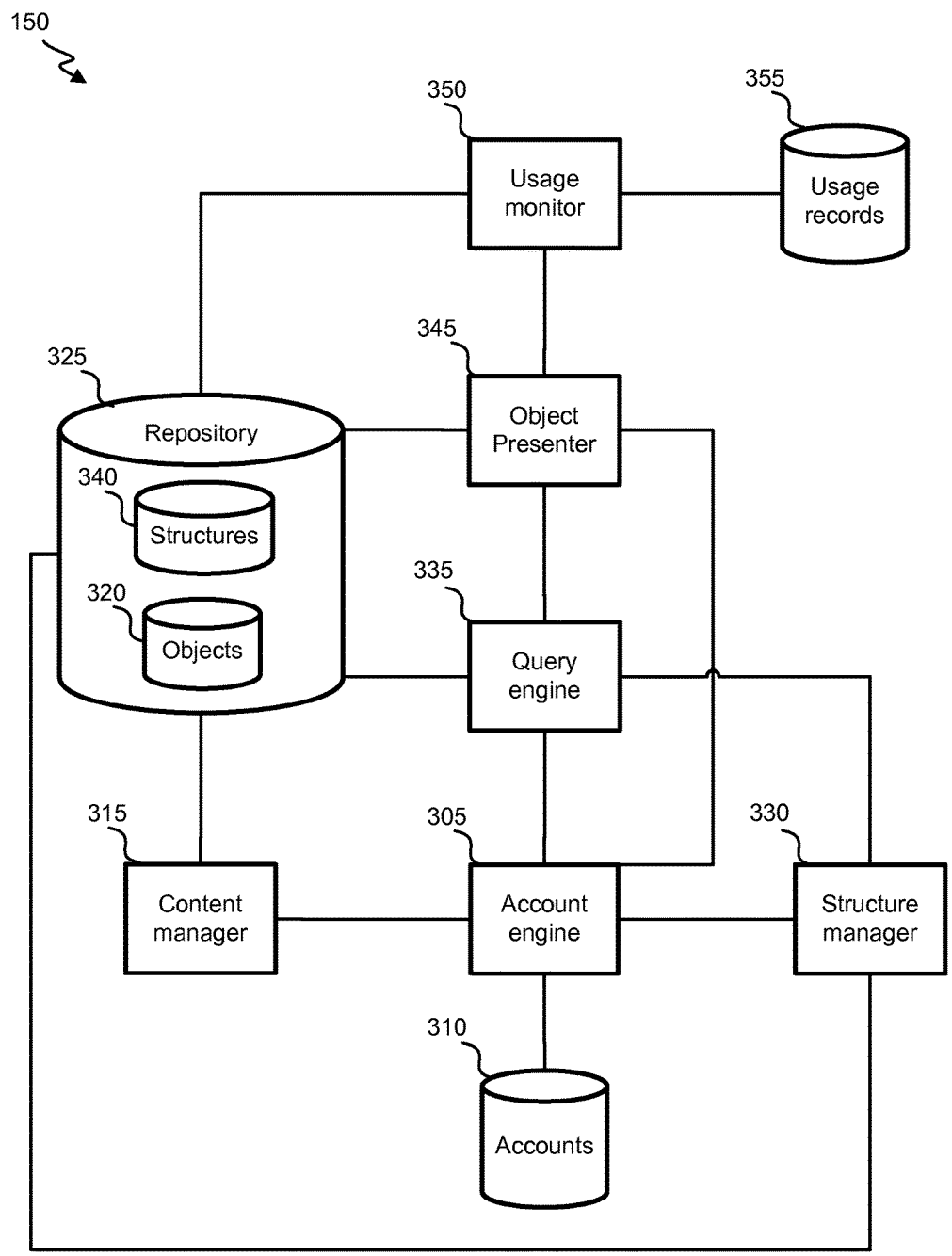
FIG. 3 depicts a block diagram of an embodiment of nexus publishing system.

Referring next to FIG. 3, a block diagram of an embodiment of nexus publishing system 150 is shown. Nexus publishing system 150 can be, in part or in its entirety, in a cloud. In some instances, at least part of nexus publishing system 150 is present on a device, such as a structure-definer device 120. Thus, nexus publishing system 150 can include a distributed system.

Nexus publishing system 150 includes an account engine, which generates accounts for content providers 105, structure definers 115 and/or learners 125 and verifies identities of content providers 105, structure definers 115 and/or learners 125. For example, account engine 305 can collect personal (e.g., name, email address, residence address, telephone number and occupation), corporate, billing and/or login (e.g., username and password) information. Further, account engine 305 can characterize a system-accessing party as a content provider 105, structure definer 115 or learner 125. This classification can be performed, e.g., based on input from the respective party or a presence of an accurate code. The collected information can be used to define an account and can be stored in an accounts database 310. Subsequently, account engine 305 can verify an identity of a party by, e.g., ensuring that information entered by the party (e.g., login information) consistently matches that in a stored account. Account engine 305 can restrict a party's access to system 150 if the party is not logged into an account. Further, once a party is associated with an account, account engine 305 can identify whether the party is a content provider 105, structure definer 115 or learner 125. Features of system 150 (e.g., interface appearances, content access, structure-modification abilities, etc.) can be configured based on this identity or party type (e.g., content provider, structure definer or learner).

In one instance, account engine 305 verifies that a party entered login information that matches that in an account, the account having a characteristic indicating that the party can add or edit content objects in system 150. Account engine 305 can then identify the party as a content provider 105 and can allow the party to interact with content manager 315 in order to provide or modify content objects that can be identified in structures and/or presented to learners 125. Content manager 315 can cause the new or modified content object to be stored in an object data store 320 within a repository 325.

A content provider 105 can provide content objects by uploading the objects or interacting with an interface to construct an object (e.g., by entering text, formatting a file, creating graphics, etc.). In some instances, content provider 105 provides a link or other identification to a system-external content object. Thus, in these instances, the content object need not itself be stored in the system-internal object data store 320. Rather, object data store 320 can store a directing identifier (e.g., an HTML link) such that the content object can nonetheless be accessed.

Content manager 315 can also restrict a content provider's ability to add or modify content objects. For example, an account can identify a control level, a position type (e.g., "teacher"), an employer, etc., and restrictions can then be appropriately imposed. One example of a restriction is limiting a type of content objects that can be uploaded to object data store 320. Another example of a restriction is restricting an audience that a content provider can specify as pertaining to an object (e.g., an audience which can access the object or an audience to whom the object is presented to or promoted to).

In some instances, a provided content object (i.e., a "parent content object") itself includes a plurality of content objects ("children content objects"). For example, a parent content object can be a book, which includes a number of book-chapter children content objects. These children content objects can be automatically detected (e.g., based on object metadata) or identified by content provider 105 (e.g., such that content provider 105 provides a page range and name for each child content object). In some instances, content provider 105 can provide a plurality of individual content objects and can subsequently generate a parent content object (e.g., by identifying a set of individual content objects to be children of the parent).

Content providers 105 can further provide information pertaining to a content object, which can include information characterizing the content object (e.g., name, author, publication date, keyword(s), skill level, detail level, or language) and/or information pertaining to access to the content object (e.g., rights restrictions, target audience identification or copy-and-paste ability). This information can be stored as metadata associated with the content object. In some instances, a content object itself includes the metadata; in some instances, the metadata is stored separately from the content object. Metadata can also include automatically identified information. For example, text in a content object can be scanned and prominent (e.g., repeated), substantive (e.g., non-article) terms can be identified as keywords. As a further example, a time of upload can be detected and/or a party providing the object can be identified and included in the metadata. Metadata can identify familial relationships of content objects, such as an object's parent object, child object or sibling object.

In one instance, account engine 305 verifies that a party entered login information that matches that in an account, the account having a characteristic indicating that the party can define and/or modify structures in system 150. The party can then be identified as being a structure definer 115 and can be allowed to interact with structure manager 330 in order to generate or modify structures that can be used to identify content objects that are to be presented to and/or made accessible to a learner 125.

Structure definer 115 can interact with structure manager 330 to generate and/or modify a structure. For example, structure definer 115 may specify a number of elements (e.g., weeks, levels or webpages) to represent in the structure. Structure definer 115 may further identify one or more learning objectives and/or concepts to associate with the structure in general and/or with one or more specific elements. In some instances, structure manager 330 presents a partial or full list of available learning objectives and/or concepts, and structure definer 115 then selects the appropriate objectives and/or concepts. The partial list can include, e.g., those matching a query entered by the structure definer, those matching a characteristic of the overall structure (e.g., a grade level) or those that are commonly selected.

Structure manager 330 can interact with a query engine 335, such that, e.g., a structure definer 115 can search for content objects in object data store 320 or can browse through the stored objects. For example, a structure definer 115 can search for objects provided by a specific party, objects associated with a specific grade level, objects associated with a specific keyword, objects associated with a specific learning objective, and/or objects of a specific type. In one instance, structure manager 330 generates a query without an explicit query from a structure definer 115. For example, structure manager 330 may generate a query based on characteristics (e.g., concepts, grade level and/or titles) of a structure or structure elements provided by a structure definer 115. As another (e.g., additional or alternative)

example, structure manager 330 may generate a query based on characteristics of a structure definer (her occupation, employer or preferences). The recommendations can further be sensitive to object restrictions (e.g., license-based and/or geographical rights restrictions).

Identifications of content objects (e.g., as search results, browsing results and/or object recommendations) can identify, e.g., a content object's name, type, skill level, author and/or rights characteristic. In some instances, a structure definer 115 can request additional detail for one or more specific objects. For example, a structure definer 115 can click on a content-object identification or a "Preview" option, which can cause part or all of the content object to be presented.

Frequently, more than one content object will be simultaneously identified to content definer 115. Content objects for which information is concurrently displayed may be related based on a shared concept, a shared learning objective, a shared skill or grade level, inter-object relationships identified by a content provider, and/or being concurrently present in one or more structures (e.g., a threshold number of structures) or part thereof (e.g., an element of a structure). Thus, for example, a content definer 115 may be viewing details pertaining to a first content object, and identifications of one or more related second content can be simultaneously presented. As another example, a structure may include a representation of one or more first content objects, and identifications of other content objects related to a first content object of the one or more first content objects can be presented.

In one instance, a relatedness metric can be determined for each of one, more or all content objects in object data store 320. The metric can be based on a number of shared characteristics (e.g., concepts, learning objectives and/or skill level). The relatedness metric can be used to determine which content objects to identify (e.g., only identifying those with a relatedness metric above an absolute or relative threshold, such as metrics with the five highest metrics) and/or how to arrange (e.g., order) presentations.

In instances where identifications of multiple content objects are presented, the identifications can be presented in an organized manner. For example, identifications can be grouped based on a type of content object, a skill or grade level, a concept, a learning proposition, and/or a popularity measure.

Query engine 335 can also identify related content objects based on a presented content object itself. For example, a presented content object can include a cross-link or reference that can be used to identify another content object. These related objects identified based on the content analysis can also be separately identified to a learner 125 (e.g., having a "Cross Reference" section with links to the objects). As another example, a presented content object can be associated with metadata identifying a keyword. Interface engine 345 can identify the keyword. If a user selects the identification, query engine 335 can search for other content objects having a same or similar keyword, and interface engine 345 can then identify the query results.

Structure definer 115 can further interact with representations of the content object and/or a representation of a structure to add the content object to the structure. For example, a structure definer 115 can click on an "add to structure" option associated with a content object, which can cause a representation of elements and/or learning objectives in a structure to be presented, such that the structure definer 115 can indicate where, within the structure, the object is to be added. As another example, a structure definer 115 can begin by clicking an "add a content object" option, which can cause a query or recommendation interface to be presented (e.g., allowing the definer to enter a query or presenting the definer with identifications of object recommendations).

Structure definer 115 can add additional structure detail. For example, structure definer 115 can identify relationships between content objects within a structure by, e.g., identifying binary connections between select objects, by setting connection weights between some or all objects, by sequencing content objects, etc. This identification can be defined by entering text or by generating/modifying a pictorial representation of the structure. As another example, structure definer 115 can identify a condition for presenting a content object.

Structure manager 330 can store the structure in a structure data store 340 in repository 325. Structure definer 115 can further enter information indicative of to which learners the structure is to apply. For example, structure definer 115 may identify a class, such that the structure is to apply for enrollees of the class. As another example, structure definer 115 may identify learner attributes (e.g., a grade level and school), such that the structure is to apply for learners having at least one, a threshold number or all of the attributes. As yet another example, structure definer 115 may identify a list of usernames or names. The applicability specification can be stored in association with the structure (e.g., in structure data store 340 or another data store).

It will be appreciated that, in some instances, content provider 105 can serve as a structure definer 115 are the same party. Thus, content provider 105 can define relationships between content objects (e.g., while providing one or both of those objects), such as by identifying parent-child object relationships as described above.

In some instances, at least part of a structure is automatically generated. For example, a structure definer 115 can identify a number of elements for a structure and/or characteristics of the structure (e.g., a grade or skill level, one or more concepts, one or more learning objectives, a number or range of a number of content objects to assign to an element or learning objective, and/or a target (or required) proportion or number of content objects of a given type to include in the structure or associate with an element or learning objective). As another (alternative or additional) example, a structure definer 115 can identify characteristics for each of one or more elements of the structure (e.g., a placement in an order, one or more learning objectives, one or more concepts, a grade or skill level, a number or range of a number of content objects to assign to the element or learning objective, and/or a target (or required) proportion or number of content objects of a given type to include in the structure or associate with the element or learning objective). In some instances, this information can be used to automatically identify learning objectives, a sequence of learning objectives and/or an assignment of one or more learning objectives to a structure element. In some instances, this information can be used to identify (e.g., based on a query performance) appropriate content objects.

The identified content object(s) (or a subset thereof) can be automatically added to the structure (e.g., such that content objects matching a learning objective are assigned to a node associated with the learning objective). This automatic query and structure placement can include a random or pseudo-random technique. For example, a subset of query-responsive objects can be pseudo-randomly selected for inclusion in a structure, or an order of objects can be pseudo-randomly determined. A structure definer 115 may modify the structure by, e.g., removing or replacing an auto-placed content object or reordering content objects.

In one instance, a structure definer 115 can search for, view, modify and/or incorporate (into a structure under development) a structure. For example, upon receiving a query from a structure definer 115, structure manager 330 can identify one or more structures that are associated with a concept, learning objective or title corresponding to the query. As another example, when a structure under development includes a learning objective, concept or content object also associated with a second structure, an identification of the second structure can be presented. Structures can be identified concurrent with identifications of content objects or the identification can be separate. Structure definer 115 can choose to incorporate part or all of the identified structure into the structure under development. For example, the structure definer 115 can select (using a cursor) a representation of part of a structure or can identify particular elements or learning objectives (e.g., which an implicit identification of underlying structure components), and that portion of the structure can then be incorporated into the structure under development.

Object presenter 345 can present one or more content objects to a learner. Using an identification of a learner as determined by account engine 305, object presenter 345 can determine which structure(s) are applicable to the learner (e.g., by matching a characteristic of the learner to an access specification for a structure). The structure can then be used to identify which content objects are to be presented at a given time. In some instances, the determination relies on other variables, such as a skill level, grade level, preference setting or past performance of the learner. In some instances, multiple content objects are identified to a learner (e.g., the multiple objects being determined based on the structure), and the learner can select from amongst the objects to indicate which object is to be presented. In some instances, the learner can interact with object presenter 345 to submit a query (via query engine 335) to search for objects in object data store 320. Query constraints and/or prioritizations can be imposed based on the structure (e.g., such that only a subset of object data store 320 is made searchable to the learner or such that rankings of results are influenced by the structure).

For example, a learner's account can indicate that he is a student in class 56, and a structure for that class can be identified. A current position within a structure can be identified. The current position can include a first position, a position determined based on input from a learner, a position determined based on a characteristic (e.g., grade level or skill) of the learner, a position determined based on a current absolute or relative time (e.g., relative from an onset of a schedule or to an event, such as a semester beginning), a past performance of the learner and/or a past access by the learner (e.g., such that the position is set as a previous position or position immediately subsequent to a previous position). The position can include an element, learning objective and/or a content object. One or more content objects (or identifications thereof) associated with the position can then be presented.

For example, for the structure represented in FIG. 2A, a position can indicate that a learner is at Week 2, the North-America objective, and the North America chapter. The North America chapter can then be presented to the learner. In some instances, identifications of a set of content objects (the set corresponding to a location, such as a set of objects associated with a learning objective) are presented to the learner, and the learner can select which one is to be presented.

One or more components of nexus publishing system 150 (e.g., structure manager 330, query engine 335 and/or object presenter 345) can analyze information of content objects that are to be represented in a structure, are represented in a structure, are to be considered or are being considered for inclusion in a structure and/or are to be presented to a learner or structure definer. For example, a structure definer 115 may click on a representation of a content object, and structure manager 330 will then analyze information about the object. As another example, object presenter 345 can determine (based on an applicable structure) that a content object is to be presented to a learner.

The information that is analyzed can include, e.g., a rights restriction (e.g., specifying a country or entity granted access), a language or a skill level. This information can be compared to corresponding information about a structure definer 115, a structure under development, a selected learning objective, information about learners associated with the structure and/or a learner. In one instance, structure manager 330 can compare an object's version identifiers to a reference table or can scan object data store 320 for corresponding objects to determine whether the version is up to date.

If the data does not sufficiently correspond (e.g., is not the same or within a threshold measure of similarity) or if an identified object is out of data, a warning can be presented, a structure definer 115 can be blocked from viewing details for the object, a structure definer 115 can be blocked from adding the object to the structure and/or a learner 125 can be blocked from viewing (or otherwise accessing) the object. In some alternative or additional instances (e.g., after determining that the objects do not sufficiently correspond), object data store 320 can be searched to identify whether any similar objects exist with better correspondence or current information. For example, if a structure definer 115 attempts to add an $11^{th}$-grade level object for "Abraham Lincoln" to a $6^{th}$-grade structure, structure manager 330 may initiate a query for other objects pertaining to "Abraham Lincoln" closer to the $6^{th}$-grade level. As another example, if a learner 125 in Germany who is viewing Object #1 clicks on a related Object #2, but Object #2 has a rights limitation indicating that it is only accessible to those in Australia, object presenter 345 can initiate a query for similar objects with rights allowing German access. An identified alternative object can be automatically substituted for the initial object, or an option of the substitution can be presented to a structure definer 115 or learner 125, and the substitution can be performed upon request.

Presentation of an object can include a visual presentation and/or an audio presentation. The presentation may, or may not, allow for a learner to interact with presented content to thereby influence material that is subsequently presented with the same object. In some instances, presentation of an object (e.g., an assessment object) includes receiving input from a learner.

It will be appreciated that one or both of content manager 315, structure manager 330 and object presenter 345 can include an interface engine that allows a party (e.g., content provider 105, structure definer 115 or learner) to interact with nexus publishing system 150. The interfaces can, e.g., provide input prompts, provide upload capabilities, receive uploaded files, receive inputs (e.g., text), present a full or partial content object, present an identification of a content object (e.g., identifying its name, content provider and type), or present a representation of a structure. An interface can vary depending on whether a party is a content provider 105, structure definer 115 or learner 125. An interface can further depend party-defined preferences or other characteristics of the party (e.g., his employer, skill level, authorized-access level, etc.).

Nexus publishing system 150 further includes a usage monitor 350, which tracks which content objects viewed by structure definers 115, added to structures and/or are identified to and accessed by learners 125. For example, usage monitor 350 can detect that a particular content object was added to Structure #356 in association with Learning Objective #593 and was identified as being related in the structure to Object #72. Usage monitor 350 can also track access characteristics, such as a viewing time, an interaction (e.g., answers submitted to an electronic assessment content object) and/or whether and how an object was added to a structure. For example, usage monitor 350 can detect that a particular video content object was played in its entirety for 85% of learners associated with a structure that included the object. The monitoring can identify access sequences, such that a prior content object accessed before a given content object and a next content object accessed after a given content object are also noted. Usage monitor 350 can further note characteristics of a user (e.g., structure definer or learner) being monitored (e.g., a region, age, skill level, experience with nexus publishing system 150, etc.).

Based on the monitoring, usage monitor 350 can generate a usage record characterizing the monitored. The record can pertain to a single learner 125, a group of learners 125 (e.g., in a same class or at a same skill level) or all learners 125, a single structure definer 115, a group of structure definers 115 or all structure definers 115. Similarly, the record can pertain to a single content object, a group of content objects (e.g., those with a same keyword or those provided by a same content provider 105) or all content objects. In instances where the record pertains to more than one user and/or to more than one content object, statistics in the record can pertain to each of the users and/or content objects and/or the statistics can include user- and/or object-population statistics. A statistic can include an absolute statistic (e.g., an access count), a relative statistic (e.g., an access count divided by a cross-object median access count), or a conditioned statistic (e.g., an access probability given that a content object was identified to a user). In some instances, a statistic is repeatedly calculated over a time period. The record can present one or more statistics via text, numbers, tables and/or graphs (e.g., a time graph or distribution plot).

Usage monitor 350 can store a usage record in a usage-record database 355 and can present and/or transmit a usage record to a party. For example, a record reflecting a user's object access can be presented to a user (e.g., to encourage her to access many objects). As another example, a record reflecting access to a content provider's provided objects can be emailed to the content provider. As yet another example, a record showing leaners' access to objects can be presented to a structure definer 115 who generated the structure that defined which objects were to be made available to a group of learners.

Usage monitor 350 can also use the tracking to modify a structure. For example, usage monitor 350 can detect when content objects and/or learning objectives and added, removed or moved within a structure. As another example, usage monitor 350 can detect when connections between objects and/or relationships involving one or more structure components are changed. As yet another example, usage monitor 350 can detect when an accessibility type for a content object has changed. Such changes can be correlated with (or otherwise associated with via, e.g., a model) statistics involving learners' access to content objects (e.g., access to particular objects, access to objects in general or time spent accessing objects) and/or with learners' performance metrics (e.g., scores on assessments or grades in a course). The correlation or a variable of the correlation can be presented to a structure definer. In some instances, a recommended structure modification can be generated based on the correlation and presented to a structure definer or automatically implemented.

It will be appreciated that this usage analysis can be extended beyond particular content objects. For example, usage monitor 350 can characterize how object access varies across object types and can then modify structures to promote popular or unpopular object types.

Figure 4:
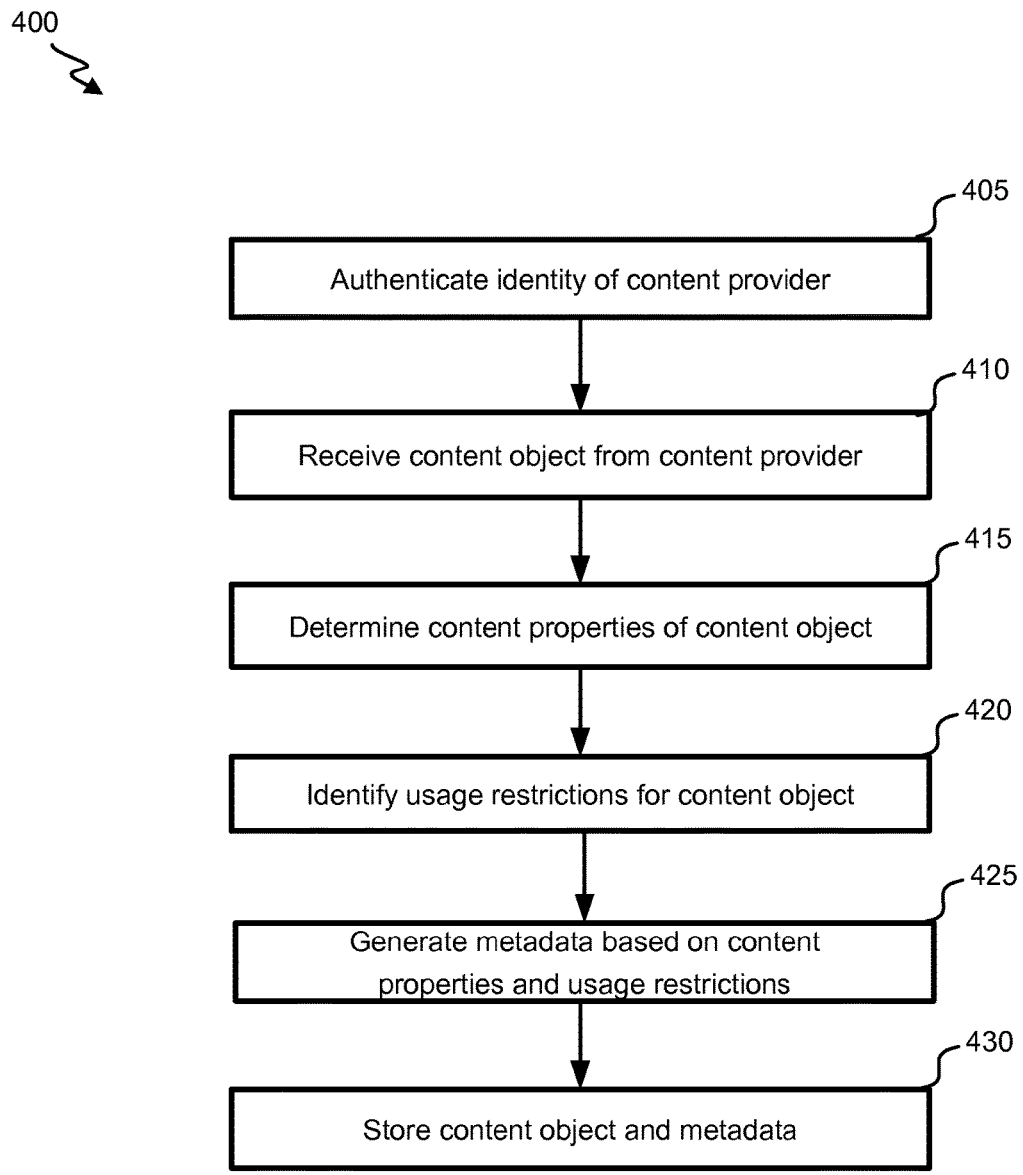
FIG. 4 illustrates a flowchart of an embodiment of a process for collecting content objects to be managed by a nexus publishing system.

FIG. 4 illustrates a flowchart of an embodiment of a process 400 for collecting content objects to be managed by a nexus publishing system 150. Process 400 begins at block 405, where account engine 305 authenticates an identity of a content provider 105. For example, account engine 305 can receive login information from a party, match the login information to that in an account, and then determine that the account has content-providing capabilities.

Content manager 315 receives a content object from content provider 105 at block 410. Content manager 315 determines one or more content properties of the content object at block 415. Determining the content properties can include: detecting a property identified by content provider 105 (such as a manually entered keyword), detecting a property identified within a content object (e.g., identified in metadata within a content object), and/or detecting a property based on an automatic assessment of content within the content object (e.g., counting words, estimating a skill level based on lengths of words, identifying a language, etc.). The property can include, e.g., a word count, a skill level, a level of detail, a keyword, an object type, a providing content provider, a publication date, a system-providing date, etc.

Content manager 315 identifies a usage or access restriction of the content object at block 420. The usage restriction can be one identified by content provider 105, identified in the content object or identified by an automatic assessment of content within the content object (e.g., by searching for the word "copyright"). The usage restriction can indicate that, e.g., the content object is to only be made accessible to (or, in some instances, identified to) structure definers or learners included in a license or within a geographical region or that the object is not to be accessible to entities associated with one or more black-listed entities.

Content manager 315 generates metadata for the content object that identifies the one or more content properties and/or usage restrictions at block 425. Content manager 315 stores the content object and metadata in object data store 320 at block 430. The metadata can be stored as part of the content object or stored separately from the content object.

Figure 5:
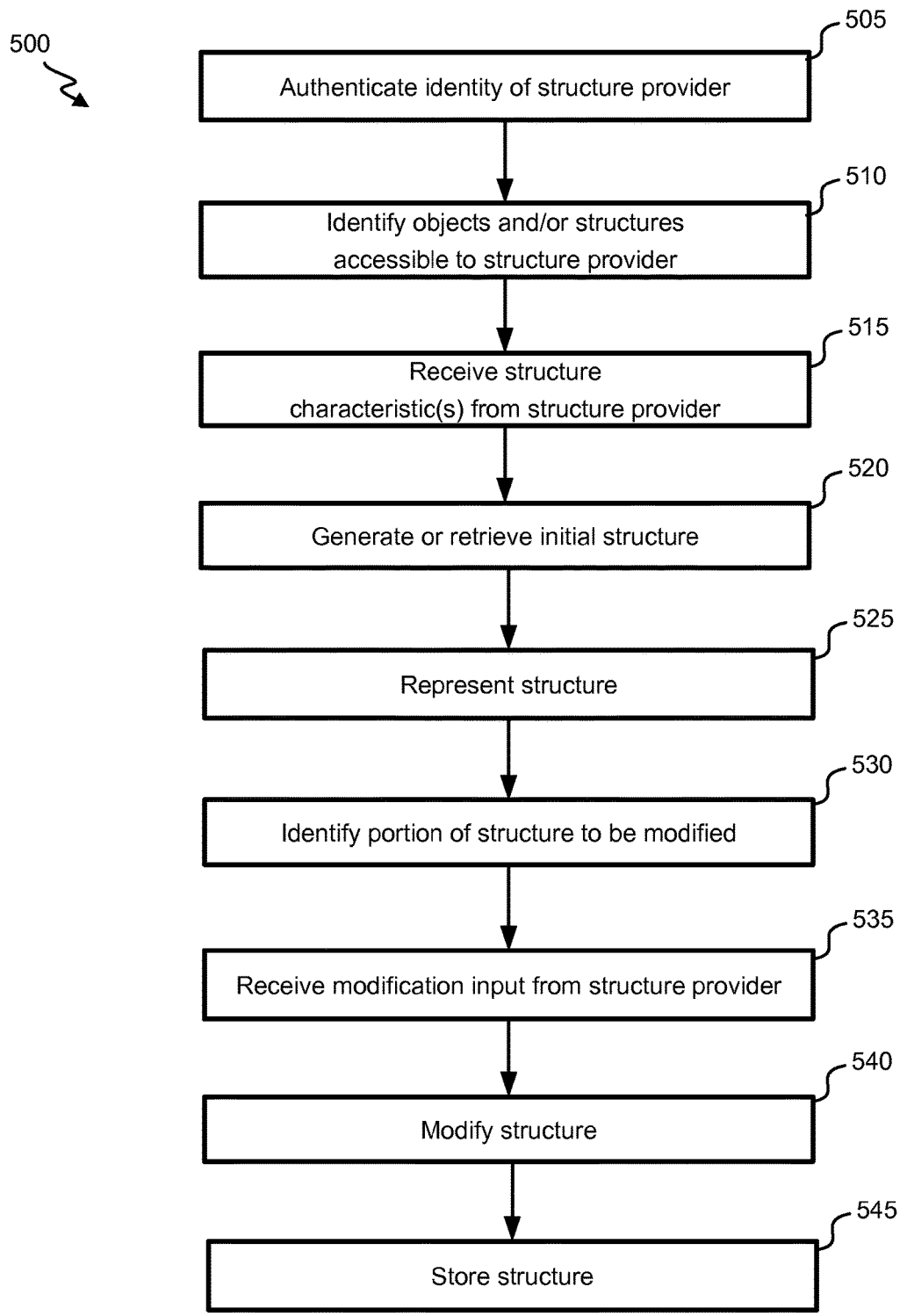
FIG. 5 illustrates a flowchart of an embodiment of a process for constructing at least part of a structure.

FIG. 5 illustrates a flowchart of an embodiment of a process 500 for constructing at least part of a structure. Process 500 begins at block 505, where account engine 305 authenticates identity of structure definer. For example, account engine 305 can receive login information from a party, match the login information to that in an account, and then determine that the account has structure-providing capabilities.

Account engine 305 identifies one or more object and/or structures that are accessible to the structure definer at block 510. Account engine 305 can, e.g., analyze characteristics associated with structures and content objects, such as permissions and/or authorship. Permissions can be set by rules, administrators and/or authors. Permissions can include a white-list of structure definers who are to be granted access, a black-list of structure definers who are to be denied access and/or a rule. Account engine 305 can analyze a rule that applies to more than one structure and/or object. For example, a rule can indicate that access to a structure is to be granted when a structure definer authored (in full or in part) a structure or when a structure author granted access to the structure definer. As another example, a rule can indicate that access to a content object is to be granted when a permission files associated with the object indicates that the structure definer is to be granted access.

In some instances, when a structure definer is granted access to a structure, he is allowed to view the structure, modify the structure, build onto the structure and/or incorporate the structure into another structure. In some instances, when a structure definer is granted access to a content object, she is allowed to view the content object, assign it to a structure and/or make the content object accessible to one or more learners associated with the structure. It will be appreciated that a definition of accessibility can change across structures and/or across content objects.

Structure manager 330 receives one or more structure characteristics from the structure definer at block 515. A characteristic can include, e.g., a name, grade level, concept, topic, identifier, author and/or one or more learners for a structure. In one instance, one or more fields are presented, such that a structure definer can enter (e.g., type) a characteristic or select the characteristic from amongst a list of potential characteristics. The characteristic(s) can be used to identify a structure existing in structure data store 340 or to generate a new structure. In one instance, a characteristic includes a structure feature, such as a number of elements in the structure and/or one or more learning objects. Structure manager 330 can present a structure definer with field prompts that request a number of elements and/or learning objectives to be included in the structure (e.g., by presenting a list of potential learning objectives).

At block 520, structure manager 330 generates or retrieves an initial structure based on the structure characteristic(s). In one instance, a new structure is generated and defining information for the structure can be set based on the characteristic(s). For example, metadata for the structure can be set to include the characteristic(s). As another example, a blank structure with a number of nodes set to a default number or set to a number as provided by a structure definer and/or with learning objectives identified by a structure definer can be generated.

In one instance, an existing structure is retrieved based on the characteristic(s). For example, query engine 335 can use the characteristic(s) to generate a query to search structure data store 340 to identify one or more structures matching the characteristic(s). One, more or all structures matching the characteristic(s) (or matching the characteristic(s) to a particular degree) can be identified to a structure definer, and a structure definer can then select a particular structure.

Structure manager 330 causes a representation of the structure to be displayed at block 525. The representation can represent, e.g., details and/or metadata of the structure (e.g., name, grade level, concept, short description, and/or concept(s)) and/or components of the structure (e.g., one or more elements, learning objectives and/or content objects) and/or relationships in the structure (e.g., sequences and/or presentation conditions). Example structure representations are shown in FIGS. 2A-2D. The representation can be presented via an interface and/or can be interactive such that a structure definer can select a part of the structure to modify or can select an option to add to the structure.

Structure manager 330 identifies a portion of the structure to be modified at block 530. The identification can be based on a default or on input from the structure definer. For example, a structure definer can select representation of an element (e.g., week) or learning objective, which can then correspond to the portion. As another example, the portion can correspond to a first or earliest portion that is empty or identified as not being finalized.

Structure manager 330 receives a modification input from the structure definer at block 535. The modification input can include an indication that an element is to be added to the structure, an element is to be removed from the structure, an element is to be modified and/or multiple elements are to be reordered. The modification input can include an indication that a learning objective is to be added to the structure, a learning objective is to be removed from the structure, a learning objective is to be modified and/or an organization pertaining to one or more learning objectives is to be modified (e.g., such that a learning objective is assigned to a different element). The modification input can include an indication that a content object is to be added to the structure, a content object is to be removed from the structure, a content object is to be modified and/or an organization pertaining to one or more content objects is to be modified (e.g., such that a content object is assigned to a different element and/or learning objective).

In one instance, the representation of the structure is interactive to allow a structure definer to move components of a structure and/or to select options to add or remove a component. In one instance, a structure definer can browse or enter a query to search for a learning objective or content option and/or can select a component identified based on the browsing or search.

In addition to or instead of a modification input that pertains to organization of a structure, other types of modification input can be received. For example, a modification input can identify one or more learners for whom the structure is to apply to.

At block 540, structure manager 330 modifies the structure based on (e.g., in accordance with) the modification input. For example, a component (e.g., an element, learning objective or content object) can be added to or removed from a structure and/or one or more components can be reorganized within the structure or modified. Structure manager 330 stores the modified structure in structure data store 340 at block 545.

Figure 6:
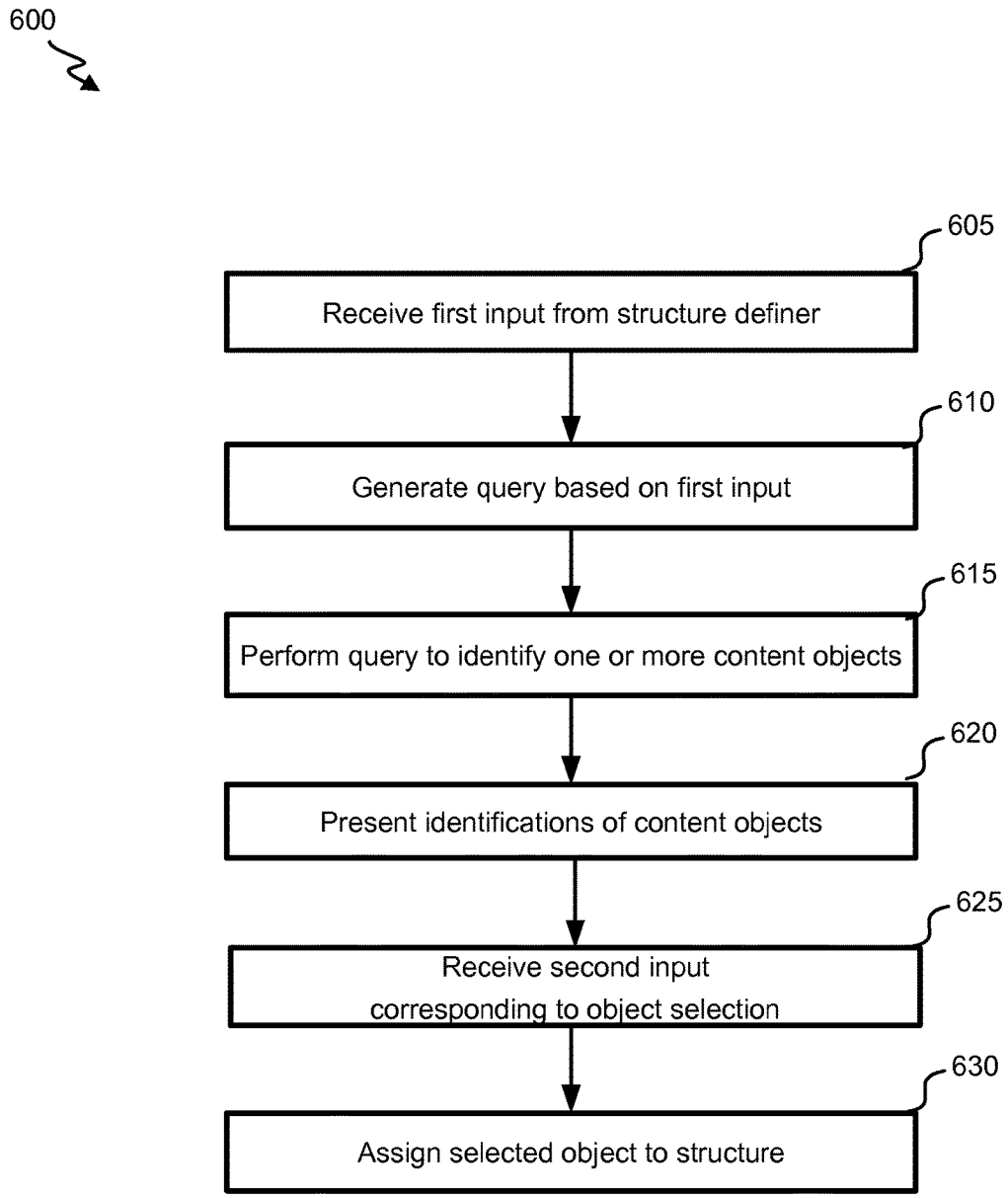
FIG. 6 illustrates a flowchart of an embodiment of a process for assigning a content object to a structure.

FIG. 6 illustrates a flowchart of an embodiment of a process 600 for assigning a content object to a structure. Process 600 begins at block 605, where structure manager 330 receives a first input from a structure definer. The first input can include a text entry or selection (e.g., from amongst a list or from amongst pictorial representations). The first input can include and/or identify a keyword, topic, concept or learning objective. The first input can identify a grade level, skill level and/or object type.

Query engine 335 generates a query based on the first input at block 610. In some instances, the query is also based on information pertaining to a structure and/or structure definer. For example, if an account for a structure definer indicates that the structure definer teaches sophomore English, the query can be restricted to or biased towards sophomore-level. In some instances, the query is alternatively or additionally based on a content object being viewed, a content object for which information is being viewed or a content object that is included in a structure. For example, the query can then search for other objects related to the content object.

The query can include, e.g., a keyword, a concept, a learning objective, an object type, a grade level, an author restriction (e.g., requiring that the author work in a given school or school district or identifying a specific author) and/or an object relationship characteristic (e.g., being related to a specific object).

Query engine 335 performs the query to identify one or more content objects at block 615. Performing the query can include, e.g., searching object data store 320. In one instance, metadata of content objects is searched. One or more content objects can be identified as a result of the query performance. These results can be identified by determining how well objects and in the data store match characteristics of the query and/or based on other factors (e.g., how many learners access an object or how many structure definers include the object in a structure). In some instances, each of the query results is associated with a results weight, which can depend on a degree to which the result matched query characteristics and/or other factors.

Structure manager 330 causes identifications of the one or more content objects to be presented to the structure definer at block 620. Each identification can include information about the respective content object, such as its name, author, target grade level, duration, object type, concepts, and/or learning objectives. The identification can include text and/or a graphic (e.g., a screen shot or sample image). The identification can be presented in a manner that allows a structure definer to request additional information (e.g., to request a preview or full view of the object or to request more detailed metadata). Such request can cause structure manager 330 to present the requested information.

Structure manager 330 receives a second input corresponding to a selection of a content object of the one or more content objects. The second input can be one submitted by the structure definer. The second input can include, e.g., selecting (e.g., clicking on or touching) a representation of a content object (e.g., an image or a title) or a button associated with a content object (e.g., an "Add" button).

The second input can include additional detail that is indicative of how the object is to be added to a structure. For example, the second input can identify a structure to which the object is to be added and/or how the object is to be added to the structure (e.g., identifying an element and/or learning objective to which the object is to be associated with or identifying a position in a sequence where the object is to be placed). In one instance, the second input can include clicking on a position in a representation of a structure or dragging and dropping a representation of a content object to a position in a structure representation. The second input can identify one or more relationships (e.g., intra-structure relationships) that are to apply to the object (e.g., indicating that an assessment object is related to a chapter object or indicating that one object is an advanced version of another object). The second input can identify a presentation type (e.g, required, pushed, optional or conditional) and/or one or more conditions for presenting the object (e.g., indicating that only select learners are to have access to, indicating that it is to only be presented upon learner request or indicating that it is only to be presented after a learner views another object). It will be appreciated that the second input can include multiple inputs.

Structure manager 330 assigns the selected object to a structure at block 630. The assignment can be in accordance with instructions provided (e.g., by the structure definer) as to how the object is to be incorporated into the structure. In some instances, the assignment can be made in accordance with more global rules as to how objects are to be added to the structure (e.g., such that a default assignment is to add the object to an earliest object position or to an earliest available element or learning objective in a structure).

In some instances, receiving the second input and assigning the object can include iterative actions. For example, the object can initially be added to a general library for a structure, which can cause structure manager 330 to request information about what an accessibility type or condition is to be for the object. Further second input can provide the requested information, and the structure can be updated. Structure manager 330 can also request where, more specifically, the object is to be added within the structure. Upon receiving the information, the object can be appropriately positioned.

It will be appreciated that, while process 600 refers to queries for identifying content objects, process 600 can be modified to further or alternatively search for structures or sub-structures (e.g., a sub-structure relating a set of content objects to one or more learning objectives) in structure data store 340. In this instance, block 630 can include, e.g., incorporating the structure or sub-structure into another structure and/or incorporating one, more or all objects from the structure of sub-structure into another structure.

Thus, in some instances, a structure definer can identify objects for inclusion in a structure by searching for objects. In another instance, one or more objects can be recommended to a structure definer. For example, one or more objects related to a high-level structure characteristic (e.g., a structure topic) or to a lower-level characteristic (e.g., related to an object included in a structure) can be presented.

Figure 7:
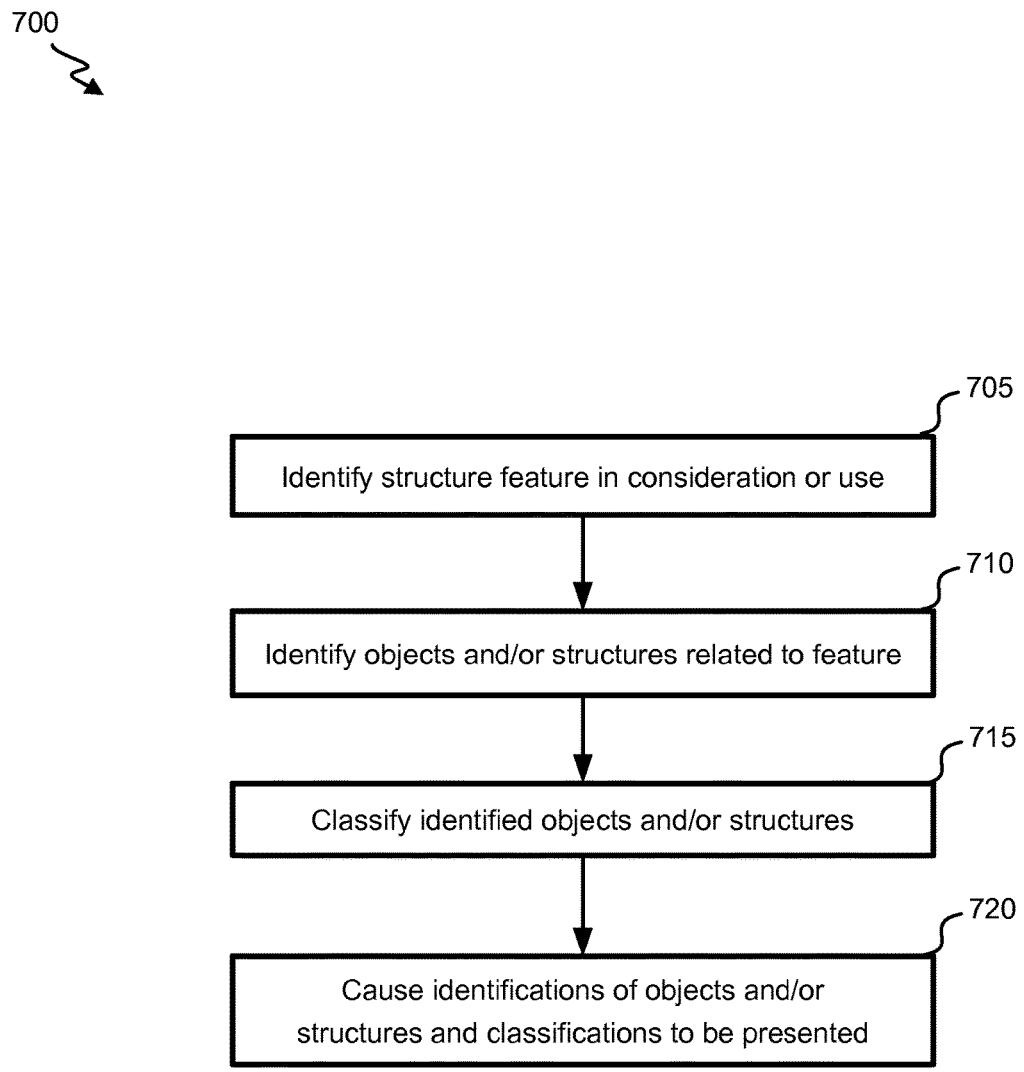
FIG. 7 illustrates a flowchart of an embodiment of a process for presenting information about related content objects.

FIG. 7 illustrates a flowchart of an embodiment of a process 700 for presenting information about related content objects. Process 700 begins at block 705, where structure manager 330 identifies a structure feature in consideration for inclusion in a structure or in use in a structure. The structure feature can include a feature pertaining to an entire structure or to a portion of the structure (e.g., to one or more elements or learning objectives). The structure feature can include, e.g., a concept, a learning objective and/or a content object (or characteristic thereof).

Structure manager 330 identifies a set of objects and/or structures related to the structure feature at block 710. The set of objects and/or structures may be related via a stored relationship (e.g., the relationship having been generated based on input from a content provider, a usage pattern or a cross-object characteristic analysis). In one instance, a query is generated based on a characteristic of the structure feature. For example, the query can include a learning objective, a concept, a keyword, a grade or skill level and/or an author associated with the structure feature. Using the query, part or all of content data store 320 and/or structure data store 340 can be searched to find objects and/or structures with one or more properties similar to or the same as a corresponding property of the structure feature.

In one instance, a relatedness metric is identified for each of a plurality of content objects and/or structures. The relatedness metric can be generated based on, e.g., how many properties are shared between the object or structure and the structure feature, a prominence of a shared property (e.g., a weight assigned to the shared concept for the object), a frequency or number of times a structure includes both the structure feature and the object or structure, and/or a frequency or number of times that a learner accesses both a structure with the structure feature (or the structure feature itself) and the object or structure. An object or object can be defined as being related to the feature when the relatedness metric crosses an absolute or relative threshold.

Structure manager 330 classifies the set of objects and/or structures at block 715. For example, each object or structure can be assigned to a category. Categories can represent, e.g., feature types (e.g., whether it is a structure or object and/or a type of structure or object), skill levels, grade levels, concepts, durations, author characteristics, usage patterns and/or access parameters. Thus, for example, each object and/or structure in the set can be assigned to a category based on whether it is a structure, chapter, an assessment, another structure or a game.

Structure manager 330 causes identifications of objects and/or structures in the set and their classifications to be presented at block 720. For example, a name of each object and/or structure in the set can be presented, and the names can be sorted based on the categories. Category names can also be presented. The presentation can allow for a structure definer to request more information for a particular presented object or structure and/or to request that the object or structure be incorporated into a current structure. Process 700 can thus allow a structure definer to identify objects and/or structures that are related to a current structure feature, such that a structure definer can easily collect a group of related objects for the structure.

Figure 8:
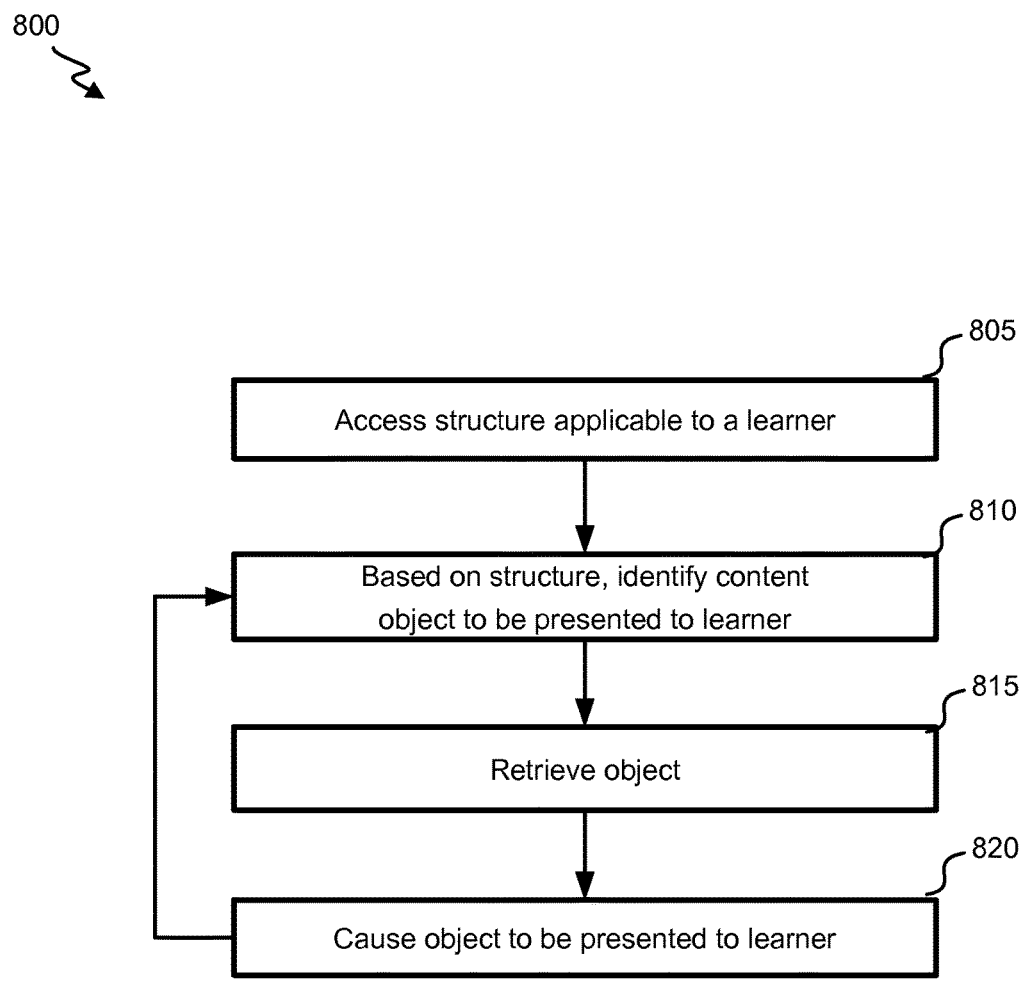
FIG. 8 illustrates a flowchart of an embodiment of a process for presenting content objects to a learner based on a structure.

FIG. 8 illustrates a flowchart of an embodiment of a process 800 for presenting content objects to a learner based on a structure. Process 800 begins at block 805, where object presenter 345 accesses a structure applicable to a learner. In one instance, account engine 205 can identify a characteristic of a learner (e.g., a course enrollment, a grade level, a location, current grade, and/or a learner identifier, such as a number, user name or real name), and object presenter 345 can identify one or more structures to be made available to the learner based on the characteristic and/or learner-access criteria associated with stored structures. Which structure(s) are to be made available can further or alternatively depend on a selection made by the learner and/or a current time.

Based on the structure, object presenter 345 identifies a content object to be presented to the learner at block 810. In one instance, the object is a default or first object in the structure. In one instance, the object is identified based on, e.g., a current time, a selection of the learner, a skill of the learner, a grade (e.g., a letter grade) associated with the learner, a result of an assessment previously taken by the learner (e.g., to bias towards presenting objects associated with concepts for which the learner did not perform well), a preference of the learner (e.g., regarding object types), past objects accessed by the learner (e.g., to bias against repeated presentation of a same object) and/or a usage pattern of objects (e.g., biasing towards objects frequently accessed by learners). In one instance, an identification of each object in a set (or all) of the objects included in the structure (or a portion of the structure, such as those associated with a structure element or learning objective) is presented to a learner, and a learner can then select one to be presented.

Object presenter 345 then retrieves the content object from object data store 320 at block 815. In some instances, object presenter 345 can determine that the identified content object cannot be presented to a learner (e.g., based on a usage restriction), that a property (e.g., language or skill level) of the content object does not match a corresponding property of the learner or structure, or that the content object is not current. Object presenter 345 can then, in some instances, attempt to identify another corresponding object (e.g., one without the usage restriction, one with a property matching the corresponding property of the learner or structure or one that is current). This corresponding object can be automatically substituted for the identified object or an option can be presented to a user to access the corresponding object instead of the identified object.

At block 820, object presenter 345 causes the object to be presented to the learner. Thus, for example, the object can be presented via a webpage, can be made available for streaming or can be made available for download to a machine of the learner. In one instance, an identification of each of one or more related objects and/or other objects in the structure (and/or a representation of the structure) can concurrently be displayed to the learner, such that the learner can navigate through the structure.

Following the presentation, process 800 can return to block 810 to identify a next object to be presented. In this manner, a variety of objects can be presented to a learner, each of which can be identified based on a structure. Thus, a structure definer can guide a learner through objects to facilitate learning.

Figure 9:
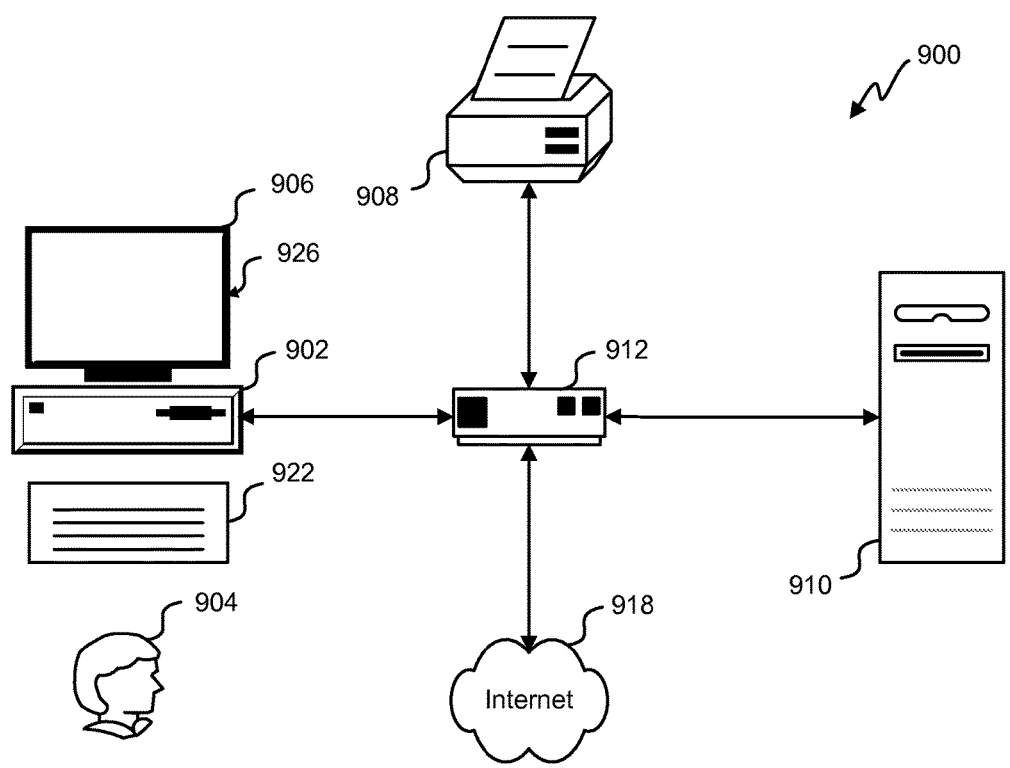
FIG. 9 depicts a block diagram of an embodiment of a computer system.

Referring next to FIG. 9, an exemplary environment with which embodiments can be implemented is shown with a computer system 900 that can be used by a designer 904 to design, for example, electronic designs. The computer system 900 can include a computer 902, keyboard 922, a network router 912, a printer 908, and a monitor 906. The monitor 906, processor 902 and keyboard 922 are part of a computer system 926, which can be a laptop computer, desktop computer, handheld computer, mainframe computer, etc. Monitor 906 can be a CRT, flat screen, etc.

A designer 904 can input commands into computer 902 using various input devices, such as a mouse, keyboard 922, track ball, touch screen, etc. If the computer system 900 comprises a mainframe, a designer 904 can access computer 902 using, for example, a terminal or terminal interface. Additionally, computer system 926 can be connected to a printer 908 and a server 910 using a network router 912, which can connect to the Internet 918 or a WAN.

Server 910 can, for example, be used to store additional software programs and data. In one embodiment, software implementing the systems and methods described herein can be stored on a storage medium in server 910. Thus, the software can be run from the storage medium in server 910. In another embodiment, software implementing the systems and methods described herein can be stored on a storage medium in computer 902. Thus, the software can be run from the storage medium in computer system 926. Therefore, in this embodiment, the software can be used whether or not computer 902 is connected to network router 912. Printer 908 can be connected directly to computer 902, in which case, computer system 926 can print whether or not it is connected to network router 912.

Figure 10:
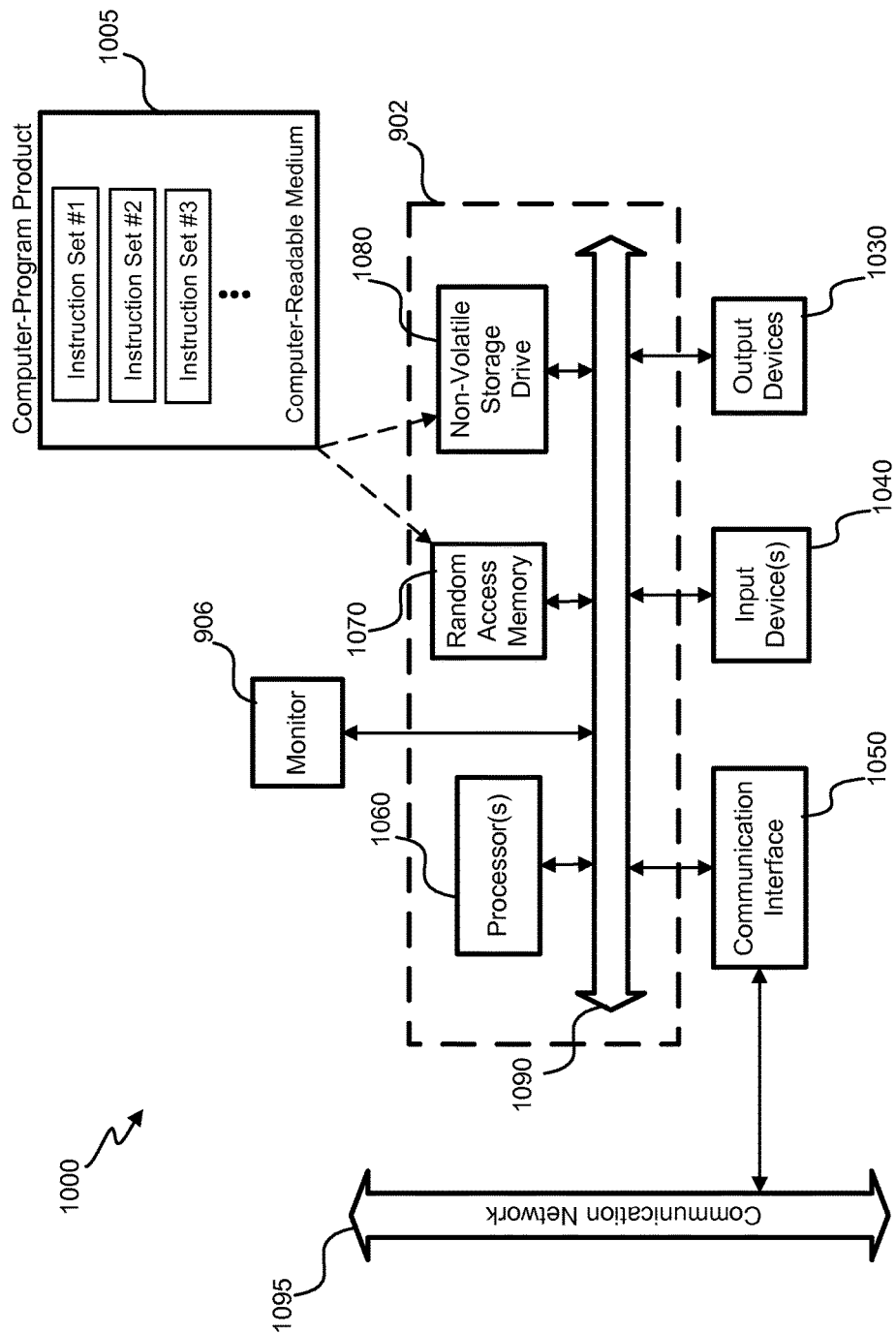
FIG. 10 depicts a block diagram of an embodiment of a special-purpose computer system.

With reference to FIG. 10, an embodiment of a special-purpose computer system 1000 is shown. Nexus publishing system 150 and/or any components thereof are examples of a special-purpose computer system 1000. Thus, for example, one or more special-purpose computer systems 1000 can be used to provide the function of nexus publishing system 150. The above methods can be implemented by computer-program products that direct a computer system to perform the actions of the above-described methods and components. Each such computer-program product can comprise sets of instructions (codes) embodied on a computer-readable medium that directs the processor of a computer system to perform corresponding actions. The instructions can be configured to run in sequential order, or in parallel (such as under different processing threads), or in a combination thereof. After loading the computer-program products on a general purpose computer system 926, it is transformed into the special-purpose computer system 1000.

Special-purpose computer system 1000 comprises a computer 902, a monitor 906 coupled to computer 902, one or more additional user output devices 1040 (optional) coupled to computer 902, one or more user input devices 1035 (e.g., keyboard, mouse, track ball, touch screen) coupled to computer 902, an optional communications interface 1055 coupled to computer 902, a computer-program product 1005 stored in a tangible computer-readable memory in computer 902. Computer-program product 1005 directs system 1000 to perform the above-described methods. Computer 902 can include one or more processors 1060 that communicate with a number of peripheral devices via a bus subsystem 1090. These peripheral devices can include user output device(s) 1040, user input device(s) 1035, communications interface 1055, and a storage subsystem, such as random access memory (RAM) 1070 and non-volatile storage drive 1080 (e.g., disk drive, optical drive, solid state drive), which are forms of tangible computer-readable memory.

Computer-program product 1005 can be stored in non-volatile storage drive 1090 or another computer-readable medium accessible to computer 902 and loaded into memory 1070. Each processor 1060 can comprise a microprocessor, such as a microprocessor from Intel® or Advanced Micro Devices, Inc®, or the like. To support computer-program product 1005, the computer 902 runs an operating system that handles the communications of product 1005 with the above-noted components, as well as the communications between the above-noted components in support of the computer-program product 1005. Exemplary operating systems include Windows® or the like from Microsoft Corporation, Solaris® from Sun Microsystems, LINUX, UNIX, and the like.

User input devices 1035 include all possible types of devices and mechanisms to input information to computer system 902. These can include a keyboard, a keypad, a mouse, a scanner, a digital drawing pad, a touch screen incorporated into the display, audio input devices such as voice recognition systems, microphones, and other types of input devices. In various embodiments, user input devices 1035 are typically embodied as a computer mouse, a trackball, a track pad, a joystick, wireless remote, a drawing tablet, a voice command system. User input devices 1035 typically allow a user to select objects, icons, text and the like that appear on the monitor 906 via a command such as a click of a button or the like. User output devices 1040 include all possible types of devices and mechanisms to output information from computer 902. These can include a display (e.g., monitor 906), printers, non-visual displays such as audio output devices, etc.

Communications interface 1055 provides an interface to other communication networks and devices and can serve as an interface to receive data from and transmit data to other systems, WANs and/or the Internet 918. Embodiments of communications interface 1055 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1055 can be coupled to a computer network, to a FireWire® bus, or the like. In other embodiments, communications interface 1055 can be physically integrated on the motherboard of computer 902, and/or can be a software program, or the like.

RAM 1070 and non-volatile storage drive 1080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1070 and non-volatile storage drive 1080 can be configured to store the basic programming and data constructs that provide the functionality of various embodiments of the present invention, as described above.

Software instruction sets that provide the functionality of the present invention can be stored in RAM 1070 and non-volatile storage drive 1080. These instruction sets or code can be executed by processor(s) 1060. RAM 1070 and non-volatile storage drive 1080 can also provide a repository to store data and data structures used in accordance with the present invention. RAM 1070 and non-volatile storage drive 1080 can include a number of memories including a main random access memory (RAM) to store of instructions and data during program execution and a read-only memory (ROM) in which fixed instructions are stored. RAM 1070 and non-volatile storage drive 1080 can include a file storage subsystem providing persistent (non-volatile) storage of program and/or data files. RAM 1070 and non-volatile storage drive 1080 can also include removable storage systems, such as removable flash memory.

Bus subsystem 1090 provides a mechanism to allow the various components and subsystems of computer 902 communicate with each other as intended. Although bus subsystem 1090 is shown schematically as a single bus, alternative embodiments of the bus subsystem can utilize multiple busses or communication paths within computer 902.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. An educational semantic-based publishing system for facilitating development of structures identifying a series of content objects, the semantic-based publishing system comprising:
   an educational content-object data store that includes data for each of a plurality of educational content objects;
   a structure manager that:
      generates or accesses a learning structure that is segmented into a plurality of elements, each element in the plurality of elements corresponding to a topic to be learned in an instructional course in a learning environment, and the learning structure identifying a learning sequence for the elements that indicates that a first topic corresponding to a first element is to be learned prior to a second topic corresponding to a second topic;
      receives a first input from a structure defining user that identifies an object characteristic, wherein the structure defining user includes an instructor of the instructional course;
      causes an identification of a first content object that is associated with the object characteristic to be presented, wherein the plurality of educational content objects includes the first content object;
      receives one or more second inputs from the structure defining user that indicates that:
         each of the first content object, a second content object and a third content object is to be added to a learning structure in association with an element in the plurality of elements, the association indicating that each of the first content object, the second content object and the third content object is to be presented to facilitate learning about the topic corresponding to the associated element; and
         access to the third content object at a student device is to be restricted until an access condition is satisfied, the access condition indicating an access or presentation of the second content object has occurred at the student device:
      modifies the learning structure to include:
         an identification of the first content object at a first position in the learning structure that is in association with a first element in the plurality of elements;
         an identification of the second content object at a second position in the learning structure that is in association with a second element in the plurality of elements such that the first content object is to be presented prior to the second content object;
         an identification of the third content object at a third position in the learning structure that is in association with the second element in the plurality of elements such that the first content object is to be presented prior to the third content object; and
         a relationship between the third content object and the second content object that indicates that access to the third content object is to be restricted until the access condition is satisfied;
      causes a representation of the learning structure to be presented to the structure defining user, wherein the representation indicates that:
         the first content object is included at the first position in the learning structure that is in association with the first element in the plurality of elements;
         the second content object is included at the second position in the learning structure that is in association with the second element;
         the third content object is included at the third position in the learning structure that is in association with the second element; and
         the third content object is related to the second content object; and
   a query engine that:
      generates a query for searching the plurality of educational content objects to identify one or more content objects associated with the object characteristic; and
      searches the content-object data store using the query to identify the first content object.

2. The educational semantic-based publishing system for facilitating development of structures identifying a series of content objects as recited in claim 1, further comprising an object presenter that:
  determines that the learning structure applies to a learner;
  determines, based on the learning structure, that the first content object is to be presented to the learner; and
  causes the first content object to be presented to a device associated with the learner.

3. The educational semantic-based publishing system for facilitating development of structures identifying a series of content objects as recited in claim 1, further comprising an object presenter that:
  determines that the learning structure applies to a learner;
  determines, based on the learning structure, that an identification of the first content object and an identification of the second content object are to be presented to the learner;
  causes the identification of the first content object and the identification of the second content object to be presented;
  detects a learner input corresponding to a selection of the first content object; and
  causes the first content object to be presented to the learner.

4. The educational semantic-based publishing system for facilitating development of structures identifying a series of content objects as recited in claim 1, wherein:
  the query engine further:
    generates a second query for searching the plurality of educational content objects to identify one or more content objects that are related to the first content object; and
    searches the content-object data store using the query to identify a set of third content objects the first content object, wherein each of the set of third content objects shares at least one topic with the first content object;
  the structure manager further causes an identification of each third content object of the set of third content objects to be presented with an indication that the third content object is related to the first content object.

5. The educational semantic-based publishing system for facilitating development of structures identifying a series of content objects as recited in claim 1, wherein:
  the object characteristic includes a topic,
  the structure manager identifies a learning objective corresponding to the topic, and
  the first content object is associates with the learning objective.

6. The educational semantic-based publishing system for facilitating development of structures identifying a series of content objects as recited in claim 1, wherein the structure manager further:
  receives a third input that identifies a condition for the second content object; and
  represents the condition and its association with the second content object in the structure, such that application of the structure causes access to the second content object to be blocked unless the condition is satisfied.

7. The educational semantic-based publishing system for facilitating development of structures identifying a series of content objects as recited in claim 1, wherein:
  the structure manager further determines a number of time-based elements to include in the structure,
  the first position corresponds to a first time-based element of the number of time-based elements, and
  the second position corresponds to a second time-based element of the number of time-based elements.

8. The educational semantic-based publishing system for facilitating development of structures identifying a series of content objects as recited in claim 1, wherein the first position and the second position indicate that the first content object is to be presented to a device associated with a learner before the second content object.

9. A method for facilitating development of structures identifying a series of content objects, the method comprising:
  storing data for each of a plurality of educational content objects in an educational content-object data store;
  generating or accessing a learning structure that is segmented into a plurality of elements, each element in the plurality of elements corresponding to a topic to be learned in an instructional course in a learning environment, and the learning structure identifying a learning sequence for the elements that indicates that a first topic corresponding to a first element is to be learned prior to a second topic corresponding to a second topic;
  receiving a first input from a structure defining user that identifies an object characteristic, wherein the structure defining user includes an instructor of the instructional course;
  generating a query for searching the plurality of educational content objects to identify one or more content objects associated with the object characteristic; and
  searching the content-object data store using the query to identify a first content object associated with the object characteristic;
  causing an identification of a first content object that is associated with the object characteristic to be presented, wherein the plurality of educational content objects includes the first content object;
  receiving one or more second inputs structure defining user that indicates that:
    each of the first content object a second content object and a third content object is to be added to a learning structure in association with an element in the plurality of elements, the association indicating that each of the first content object and the second content object, the second content object and the third content object is to be presented to facilitate learning about the topic corresponding to the associated element; and
    access to the third content object at a student device is to be restricted until an access condition is satisfied, the access condition indicating an access or presentation of the second content object has occurred at the student device;
  modifying the learning structure to include:
    an identification of the first content object at a first position in the learning structure that is in association with a first element in the plurality of elements;
    an identification of the second content object at a second position in the learning structure that is in association with a second element in the plurality of elements such that the first content object is to be presented prior to the second content object;
    an identification of the third content object at a third position in the learning structure that is in association with the second element in the plurality of elements such that the first content object is to be presented prior to the third content object; and a relationship between the third content object and the second content object that indicates that access to the third content object is to be restricted until the access condition is satisfied; and causing a representation of the learning structure to be presented to the structure defining user, wherein the representation indicates that:

the first content object is included at the first position in the learning structure that is in association with the first element in the plurality of elements;

the second content object is included at the second position in the learning structure that is in association with the second element;

the third content object is included at the third position in the learning structure that is in association with the second element; and the third content object is related to the second content object.

10. The method for facilitating development of structures identifying a series of content objects as recited in claim 9, further comprising:

determining that the learning structure applies to a learner;

determining, based on the learning structure, that the first content object is to be presented to the learner; and causing the first content object to be presented to a device associated with the learner.

11. The method for facilitating development of structures identifying a series of content objects as recited in claim 9, further comprising:

determining that the learning structure applies to a learner;

determining, based on the learning structure, that an identification of the first content object and an identification of the second content object are to be presented to the learner;

causing the identification of the first content object and the identification of the second content object to be presented to the learner;

detecting a learner input corresponding to a selection of the first content object; and causing the first content object to be presented to the learner.

12. The method for facilitating development of structures identifying a series of content objects as recited in claim 9, further comprising:

generating a second query for searching the plurality of educational content objects to identify one or more content objects that are related to the first content object;

searching the content-object data store using the query to identify a set of third content objects the first content object, wherein each of the set of third content objects shares at least one topic with the first content object; and causing an identification of each third content object of the set of third content objects to be presented to a device associated with a learner with an indication that the third content object is related to the first content object.

13. The method for facilitating development of structures identifying a series of content objects as recited in claim 9, wherein the object characteristic includes a topic, and wherein the method further comprises:

identifying a learning objective corresponding to the topic, wherein the first content object is associates with the learning objective.

14. The method for facilitating development of structures identifying a series of content objects as recited in claim 9, further comprising:

receiving a third input that identifies a condition for the second content object; and representing the condition and its association with the second content object in the structure, such that application of the structure causes access to the second content object to be blocked unless the condition is satisfied.

15. The method for facilitating development of structures identifying a series of content objects as recited in claim 9, further comprising:

determining a number of time-based elements to include in the structure, wherein the first position corresponds to a first time-based element of the number of time-based elements, and wherein the second position corresponds to a second time-based element of the number of time-based elements.

16. The method for facilitating development of structures identifying a series of content objects as recited in claim 9, wherein the first position and the second position indicate that the first content object is to be presented to a device associated with a learner before the second content object.

17. A computer-program product tangibly embodied in a non-transitory machine-readable storage medium, including instructions configured to cause one or more data processors to perform actions including:

storing data for each of a plurality of educational content objects in an educational content-object data store;

generating or accessing a learning structure that is segmented into a plurality of elements, each element in the plurality of elements corresponding to a topic to be learned in an instructional course in a learning environment, and the learning structure identifying a learning sequence for the elements that indicates that a first topic corresponding to a first element is to be learned prior to a second topic corresponding to a second topic;

receiving a first input from a structure defining user that identifies an object characteristic, wherein the structure defining user includes an instructor of the instructional course;

generating a query for searching the plurality of educational content objects to identify one or more content objects associated with the object characteristic; and searching the content-object data store using the query to identify a first content object associated with the object characteristic;

causing an identification of a first content object that is associated with the object characteristic to be presented, wherein the plurality of educational content objects includes the first content object;

receiving one or more second inputs structure defining user that indicates that:

each of the first content object a second content object and a third content object is to be added to a learning structure in association with an element in the plurality of elements, the association indicating that each of the first content object and the second content object, the second content object and the third content object is to be presented to facilitate learning about the topic corresponding to the associated element; and access to the third content object at a student device is to be restricted until an access condition is satisfied, the access condition indicating an access or presentation of the second content object has occurred at the student device;

modifying the learning structure to include:
  an identification of the first content object at a first position in the learning structure that is in association with a first element in the plurality of elements;
  an identification of the second content object at a second position in the learning structure that is in association with a second element in the plurality of elements such that the first content object is to be presented prior to the second content object;
  an identification of the third content object at a third position in the learning structure that is in association with the second element in the plurality of elements such that the first content object is to be presented prior to the third content object; and
  a relationship between the third content object and the second content object that indicates that access to the third content object is to be restricted until the access condition is satisfied; and causing a representation of the learning structure to be presented to the structure defining user, wherein the representation indicates that:
  the first content object is included at the first position in the learning structure that is in association with the first element in the plurality of elements;
  the second content object is included at the second position in the learning structure that is in association with the second element;
  the third content object is included at the third position in the learning structure that is in association with the second element; and
  the third content object is related to the second content object.

18. The computer-program product as recited in claim 17, wherein the actions further include:
  determining that the learning structure applies to the learner;
  determining, based on the learning structure, that the first content object is to be presented to the learner; and
  causing the first content object to be presented to the learner.

19. The computer-program product as recited in claim 17, wherein the actions further include:
  generating a second query for searching the plurality of educational content objects to identify one or more content objects that are related to the first content object;
  searching the content-object data store using the query to identify a set of third content objects the first content object, wherein each of the set of third content objects shares at least one topic with the first content object; and
  causing an identification of each third content object of the set of third content objects to be presented with an indication that the third content object is related to the first content object.

20. The computer-program product as recited in claim 17, wherein the actions further include:
  receiving a third input that identifies a condition for the second content object; and
  representing the condition and its association with the second content object in the structure, such that application of the structure causes access to the second content object to be blocked unless the condition is satisfied.

* * * * *